United States Patent
Nagami et al.

(10) Patent No.: US 12,443,007 B2
(45) Date of Patent: Oct. 14, 2025

(54) IMAGING LENS AND IMAGING APPARATUS

(71) Applicant: FUJIFILM Corporation, Tokyo (JP)

(72) Inventors: Ryosuke Nagami, Saitama (JP); Hiroki Saito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 607 days.

(21) Appl. No.: 17/843,233

(22) Filed: Jun. 17, 2022

(65) Prior Publication Data
US 2023/0003968 A1    Jan. 5, 2023

(30) Foreign Application Priority Data

Jun. 21, 2021 (JP) ................................ 2021-102745
May 25, 2022 (JP) ................................ 2022-085577

(51) Int. Cl.
*G02B 9/04* (2006.01)
*G02B 13/18* (2006.01)

(52) U.S. Cl.
CPC .............. *G02B 9/04* (2013.01); *G02B 13/18* (2013.01)

(58) Field of Classification Search
CPC ...................... G02B 13/0045; G02B 13/0015; G02B 13/04; G02B 13/18; G02B 9/04
USPC .......................................................... 359/793
See application file for complete search history.

(56) References Cited

U.S. PATENT DOCUMENTS

2019/0391368 A1* 12/2019 Miyagishima ..... G02B 13/0045
2021/0088762 A1    3/2021 Saito

FOREIGN PATENT DOCUMENTS

| JP | 2008040395 A | * | 2/2008 | ..... G02B 15/144113 |
| JP | 2013161076 A | * | 8/2013 | |
| JP | 2017078770 A | * | 4/2017 | ........... G02B 15/173 |
| JP | 2018018041 A | * | 2/2018 | |
| JP | 2020-129022 A | | 8/2020 | |
| JP | 2021-047384 A | | 3/2021 | |

* cited by examiner

*Primary Examiner* — Pinping Sun
*Assistant Examiner* — Alaina Marie Swanson
(74) *Attorney, Agent, or Firm* — Studebaker Brackett PLLC

(57) ABSTRACT

An imaging lens consisting of, in order from an object side to an image side: a front group; a stop; and a rear group that has a positive refractive power. The imaging lens satisfies predetermined conditional expressions.

20 Claims, 24 Drawing Sheets

IMAGING LENS AND IMAGING APPARATUS

CROSS-REFERENCE TO RELATED APPLICATIONS

The present application claims priority under 35 U.S.C. § 119 to Japanese Patent Application No. 2021-102745, filed on Jun. 21, 2021, and No. 2022-085577, filed on May 25 2022. The above applications are hereby expressly incorporated by reference, in their entirety, into the present application.

BACKGROUND

Technical Field

The technique of the present disclosure relates to an imaging lens and an imaging apparatus.

Related Art

In the related art, as an imaging lens used in an imaging apparatus such as a digital camera, for example, the lens systems described in JP2020-129022A and JP2021-047384A are known.

In recent years, there has been a demand for an imaging lens having a wide angle, a small size, and favorable optical performance.

SUMMARY

The present disclosure provides an imaging lens having a wide angle, a small size, and favorable optical performance, and an imaging apparatus comprising the imaging lens.

According to a first aspect of the present disclosure, there is provided an imaging lens consisting of, in order from an object side to an image side: a front group; a stop; and a rear group that has a positive refractive power. Assuming that a height of a principal ray with a maximum image height from an optical axis in a plane which is perpendicular to the optical axis and which passes through an intersection between the optical axis and a lens surface closest to the object side in a state in which an infinite distance object is in focus is H, a focal length of a whole system in a state in which the infinite distance object is in focus is f, a sum of a back focal length in terms of air conversion distance and a distance on the optical axis from the lens surface closest to the object side to a lens surface closest to the image side in a state in which the infinite distance object is in focus is TL, a maximum half angle of view of the whole system is tom, and a unit of tom is degree, Conditional Expressions (1), (2), and (3) are satisfied, which are represented by $$1 < H/(f \times \tan \omega m) < 1.8 \tag{1},$$

$$3.1 < TL/(f \times \tan \omega m) < 5.2 \tag{2, and}$$

$$52 < \omega m < 74 \tag{3}.$$

In the first aspect, during focusing, at least a part of the front group may move, and the rear group may remain stationary with respect to the image plane.

In the first aspect, assuming that a focal length of the front group in a state in which the infinite distance object is in focus is ff, and a focal length of the rear group is fr, it is preferable that Conditional Expression (4) is satisfied, which is represented by $$0.2 < ff/fr < 2 \tag{4}.$$

In the first aspect, during focusing, at least a part of the rear group may move, and the front group may remain stationary with respect to the image plane.

In the first aspect, the imaging lens may further include: a first lens that is a negative meniscus lens which is disposed closest to the object side and has a convex surface facing toward the object side; and a second lens that is a negative meniscus lens which is disposed adjacent to the image side of the first lens and has a convex surface facing toward the object side.

In the first aspect, assuming that a curvature radius of an object side surface of the first lens is $R1f$, and a curvature radius of an image side surface of the first lens is $R1r$, it is preferable that Conditional Expression (5) is satisfied, which is represented by $$1.3 < (R1f + R1r)/(R1f - R1r) < 4.2 \tag{5}.$$

In the first aspect, the imaging lens may further include: a third lens which is disposed adjacent to the image side of the second lens, the third lens is a negative meniscus lens having aconvex surface facing toward the object side, or a plano-concave lens of which a surface on the object side is flat.

In the first aspect, assuming that a curvature radius of an image side surface of the second lens is $R2r$, and a curvature radius of an object side surface of the third lens is $R3f$, it is preferable that Conditional Expression (6) is satisfied, which is represented by $$-1 < (R2r - R3f)/(R2r + R3f) < 0.3 \tag{6}.$$

In the first aspect, the front group may consist of 5 or more and 7 or fewer lenses.

In the first aspect, the rear group may consist of 5 or more and 7 or fewer lenses.

In the first aspect, assuming that a focal length of the rear group in a state in which the infinite distance object is in focus is fr, it is preferable that Conditional Expression (7) is satisfied, which is represented by $$1 < f/fr < 7 \tag{7}.$$

In the first aspect, it is preferable that the front group includes an Lfp lens that has a positive refractive power. Assuming that an Abbe number of the Lfp lens based on a d line is vfp, it is preferable that Conditional Expression (8) is satisfied, which is represented by $$16 < vfp < 42 \tag{8}.$$

In the first aspect, it is preferable that the rear group includes an Lrp1 lens that has a positive refractive power. Assuming that a partial dispersion ratio of the Lrp1 lens between a g line and an F line is $\theta gFrp1$, and an Abbe number of the Lrp1 lens based on a d line is vrp1, it is preferable that Conditional Expression (9) is satisfied, which is represented by $$0.01 < \theta gFrp1 + 0.001618 \times vrp1 - 0.6415 < 0.1 \tag{9}.$$

In the first aspect, it is preferable that the rear group includes an Lrp2 lens that has a positive refractive power and is disposed closer to the image side than the Lrp1 lens. Assuming that a partial dispersion ratio of the Lrp2 lens between the g line and the F line is $\theta gFrp2$, and an Abbe number of the Lrp2 lens based on the d line is vrp2, it is preferable that Conditional Expression (10) is satisfied, which is represented by $$0.01 < \theta gFrp2 + 0.001618 \times vrp2 - 0.6415 < 0.1 \tag{10}.$$

In the first aspect, it is preferable that the rear group includes an Lrn1 lens that has a negative refractive power.

Assuming that a refractive index of the Lrn1 lens on a d line is Nrn1, it is preferable that Conditional Expression (11) is satisfied, which is represented by $$1.75 < Nrn1 < 2.2 \quad (11).$$

In the first aspect, it is preferable that the rear group includes an Lrn2 lens that has a negative refractive power and is disposed closer to the image side than the Lrn1 lens. Assuming that a refractive index of the Lrn2 lens on the d line is Nrn2, it is preferable that Conditional Expression (12) is satisfied, which is represented by $$1.8 < Nrn2 < 2.2 \quad (12).$$

In the first aspect, assuming that a distance on the optical axis from the lens surface closest to the object side to the stop is Ds, it is preferable that Conditional Expression (13) is satisfied, which is represented by $$1.2 < Ds/(f \times \tan \omega m) < 2.8 \quad (13).$$

In the first aspect, assuming that a focal length of a lens group that moves during focusing is fa, it is preferable that Conditional Expression (14) is satisfied, which is represented by $$1 < f/|fa| < 20 \quad (14).$$

In the first aspect, assuming that a distance on the optical axis from the lens surface closest to the object side to the stop in a state in which the infinite distance object is in focus is Ds, it is preferable that Conditional Expression (15) is satisfied, which is represented by $$0.3 < Ds/TL < 0.6 \quad (15).$$

According to a second aspect of the present disclosure, there is provided an imaging apparatus comprising an imaging lens according to the above-mentioned aspect.

In the present specification, it should be noted that the terms "consisting of" and "consists of" mean that the lens may include not only the above-mentioned components but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, the term "~group that has a positive refractive power" means that the group has a positive refractive power as a whole. The terms "front group" and "rear group" are not limited to a configuration consisting of a plurality of lenses, but may consist of only one lens. The terms "lens that has a positive refractive power" and "a positive lens" are synonymous. The terms "lens that has a negative refractive power" and "a negative lens" are synonymous. The terms "negative meniscus lens" and "lens that has a negative refractive power in the shape of a meniscus" are synonymous.

The term "a single lens" means one lens that is not cemented. Here, a compound aspherical lens (that is, a lens in which a spherical lens and an aspherical film formed on the spherical lens are integrally formed and function as one aspherical lens as a whole) is not regarded as cemented lenses, but the compound aspherical lens is regarded as one lens. The sign of the refractive power and the surface shape of the lens including the aspherical surface will be used in terms of the paraxial region unless otherwise specified.

In the present specification, the term "whole system" means an imaging lens. The "focal length" used in a conditional expression is a paraxial focal length. The "back focal length in terms of the air conversion distance" is the air conversion distance on the optical axis from the lens surface closest to the image side in the whole system to the image plane. Regarding the sign of the curvature radius, the sign of the curvature radius of the surface having a convex surface facing toward the object side is positive and the sign of the curvature radius of the surface having a convex surface facing toward the image side is negative.

In the present specification, the values used in the conditional expressions are values based on the d line except for the partial dispersion ratio. The partial dispersion ratio $\theta gF$ between the g line and the F line of a certain lens is defined by $\theta gF = (Ng - NF)/(NF - NC)$, where Ng, NF, and NC are the refractive indices of the lens at the g line, the F line, and the C line. The "d line", "C line", "F line", and "g line" described in the present specification are emission lines. It is assumed that the d line wavelength is 587.56 nm (nanometers), the C line wavelength is 656.27 nm (nanometers), the F line wavelength is 486.13 nm (nanometers), and the g line wavelength is 435.84 nm (nanometers).

According to the above-mentioned aspect, the imaging lens and the imaging apparatus of the present disclosure each have a wide angle, a small size, and favorable optical performance.

DETAILED DESCRIPTION

Hereinafter, embodiments of the present disclosure will be described with reference to the accompanying drawings.

Figure 1:
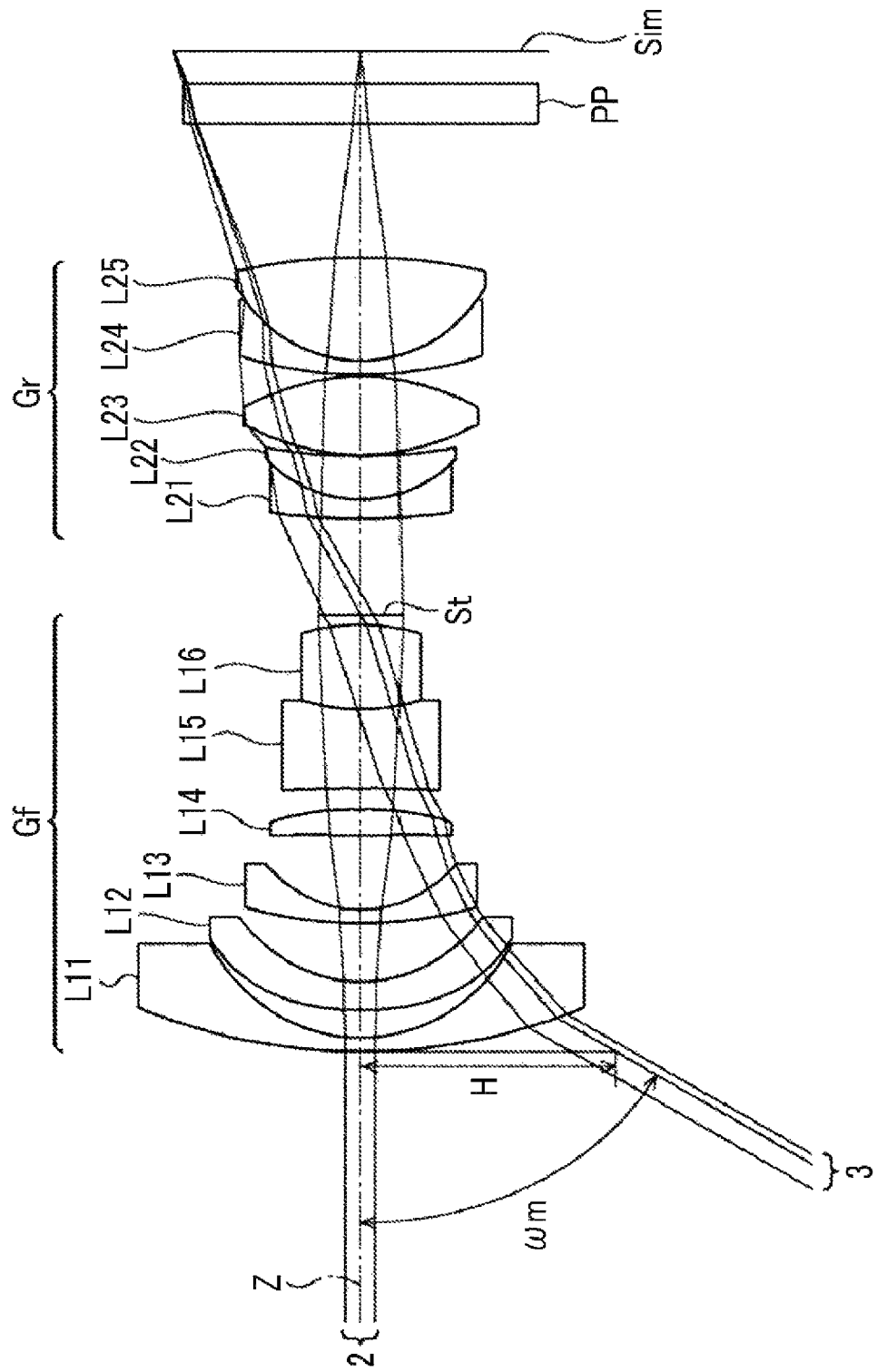
FIG. 1 is a cross-sectional view showing a configuration and luminous flux of an imaging lens according to an embodiment.

FIG. 1 shows a cross-sectional view of the configuration and luminous flux of the imaging lens according to the embodiment of the present disclosure in a state in which an infinite distance object is in focus. In the present specification, an object, of which an object distance (distance on the optical axis from the object to the lens surface closest to the object side) is at infinity, is referred to as the infinite distance object. FIG. 1 shows, as the luminous flux, an on-axis luminous flux 2 and a luminous flux 3 with a maximum half angle of view ωm. In FIG. 1, the left side is the object side and the right side is the image side. The example shown in FIG. 1 corresponds to the imaging lens according to Example 1 to be described later.

FIG. 1 shows an example in which, assuming that an imaging lens is applied to an imaging apparatus, an optical member PP having a parallel plate shape is disposed between the imaging lens and the image plane Sim. The optical member PP is a member assumed to include various filters, a cover glass, and/or the like. The various filters include a low pass filter, an infrared cut filter, and/or a filter that cuts a specific wavelength region. The optical member PP is a member that has no refractive power. It is also possible to configure the imaging apparatus by removing the optical member PP.

The imaging lens of the present embodiment consists of a front group Gf, an aperture stop St, and a rear group Gr that has a positive refractive power, in order from the object side to the image side along the optical axis Z. By providing the lenses on the object side and the image side of the aperture stop St, it is easy to correct various aberrations. For example, in the example of FIG. 1, the front group Gf consists of six lenses L11 to L16, and the rear group Gr consists of five lenses L21 to L25. The aperture stop St of FIG. 1 does not indicate a size and a shape, but indicates a position in the optical axis direction.

Further, assuming that a height of a principal ray with a maximum image height from the optical axis Z in a plane which is perpendicular to the optical axis Z and which passes through an intersection between the optical axis Z and a lens surface closest to the object side in a state in which the infinite distance object is in focus is H, a focal length of the whole system in a state in which the infinite distance object is in focus is f, a maximum half angle of view of the whole system is ωm, it is preferable that the imaging lens of the present embodiment satisfies Conditional Expression (1). For example, FIG. 1 shows H and ωm. By not allowing the corresponding value of Conditional Expression (1) to be equal to or less than the lower limit, rays with respective image heights are appropriately separated in the front group Gf. As a result, there is an advantage in correcting coma aberration. By not allowing the corresponding value of Conditional Expression (1) to be equal to or greater than the upper limit, it is possible to reduce a height from the optical axis Z in a case where the peripheral ray with the angle of view passes through the lens surface closest to the object side. As a result, there is an advantage in achieving reduction in filter diameter. In order to obtain more favorable characteristics, it is more preferable to satisfy Conditional Expression (1-1), and it is yet more preferable to satisfy Conditional Expression (1-2).

$$1 < H/(f \times \tan \omega m) < 1.8 \tag{1}$$

$$1.03 < H/(f \times \tan \omega m) < 1.65 \tag{1-1}$$

$$1.05 < H/(f \times \tan \omega m) < 1.35 \tag{1-2}$$

Further, assuming that a sum of a back focal length in terms of air conversion distance and a distance on the optical axis Z from the lens surface closest to the object side to a lens surface closest to the image side in a state in which the infinite distance object is in focus is TL, the focal length of the whole system in a state in which the infinite distance object is in focus is f, and the maximum half angle of view of the whole system is ωm, it is preferable that the imaging lens of the present embodiment satisfies Conditional Expression (2). By not allowing the corresponding value of Conditional Expression (2) to be equal to or less than the lower limit, there is an advantage in ensuring favorable optical performance. By not allowing the corresponding value of Conditional Expression (2) to be equal to or greater than the upper limit, it is possible to achieve reduction in size and weight of the imaging lens. In order to obtain more favorable characteristics, it is more preferable to satisfy Conditional Expression (2-1), and it is yet more preferable to satisfy Conditional Expression (2-2).

$$3.1 < TL/(f \times \tan \omega m) < 5.2 \tag{2}$$

$$3.3 < TL/(f \times \tan \omega m) < 5 \tag{2-1}$$

$$3.5 < TL/(f \times \tan \omega m) < 4.8 \tag{2-2}$$

Further, assuming that the maximum half angle of view of the whole system is ωm and the unit of ωm is degrees, it is preferable that the imaging lens of the present embodiment satisfies Conditional Expression (3). By not allowing the corresponding value of Conditional Expression (3) to be equal to or less than the lower limit, it is possible to improve the added value as an ultra-wide angle lens, which has been demanded in recent years. By not allowing the corresponding value of Conditional Expression (3) to be equal to or greater than the upper limit, the angle of view is prevented from becoming excessively large. As a result, there is an advantage in achieving reduction in filter diameter and ensuring favorable optical performance. In order to obtain more favorable characteristics, it is more preferable to satisfy Conditional Expression (3-1), and it is yet more preferable to satisfy Conditional Expression (3-2).

$$52 < \omega m < 74 \tag{3}$$

$$54 < \omega m < 70 \tag{3-1}$$

$$56 < \omega m < 67 \tag{3-2}$$

In the imaging lens of the present embodiment, at least a part of the front group Gf may move and the rear group Gr may remain stationary with respect to the image plane during focusing. The term "at least a part of the front group Gf" means at least one lens included in the front group Gf. According to such a configuration, it is possible to achieve reduction in size and weight of the group that moves during focusing as compared with the configuration in which the whole lens system moves during focusing. In the present specification, the group that moves during focusing is hereinafter referred to as a "focus group". Focusing is performed by moving the focus group. Examples 1 to 4 to be described later correspond to this configuration.

In a configuration in which at least a part of the front group Gf is a focus group, assuming that a focal length of the front group Gf is ff and a focal length of the rear group Gr is fr in a state in which the infinite distance object is in focus, it is preferable to satisfy Conditional Expression (4). By not allowing the corresponding value of Conditional Expression (4) to be equal to or less than the lower limit, it is easy to ensure the back focal length. By not allowing the corresponding value of Conditional Expression (4) to be equal to or greater than the upper limit, there is an advantage in suppressing barrel-shaped distortion. In order to obtain more favorable characteristics, it is more preferable to satisfy Conditional Expression (4-1), it is yet more preferable to satisfy Conditional Expression (4-2), and it is yet more preferable to satisfy Conditional Expression (4-3).

$$0.2 < f\!f/fr < 2 \tag{4}$$

$$0.5 < f\!f/fr < 2 \tag{4-1}$$

$$0.65 < f\!f/fr < 1.85 \tag{4-2}$$

$$0.7 < f\!f/fr < 1.75 \tag{4-3}$$

In the imaging lens of the present embodiment, at least a part of the rear group Gr may move and the front group Gf may remain stationary with respect to the image plane during focusing. The term "at least a part of the rear group Gr" means at least one lens included in the rear group Gr. That is, the imaging lens of the present embodiment is not limited to the configuration in which at least a part of the front group Gf is the focus group, and may be the configuration in which at least a part of the rear group Gr is the focus group. Even with such a configuration, it is possible to achieve reduction in size and weight of the focus unit as compared with the configuration in which the whole lens system moves during focusing. Examples 5 to 6 to be described later correspond to this configuration.

It is preferable that the imaging lens of the present embodiment may further include: a first lens that is a negative meniscus lens which is disposed closest to the object side and has a convex surface facing toward the object side; and a second lens that is a negative meniscus lens which is disposed adjacent to the image side of the first lens and has a convex surface facing toward the object side. By forming the lens closest to the object side and the second lens from the object side as a negative lens, the entrance pupil can be brought closer to the object side. As a result, there is an advantage in ensuring the amount of peripheral light. Further, by forming the lens closest to the object side and the second lens from the object side as a negative meniscus lens having a convex surface facing toward the object side, there is an advantage in suppressing astigmatism and distortion. In the example of FIG. 1, the lens L11 corresponds to the first lens, and the lens L12 corresponds to the second lens.

Assuming that a curvature radius of an object side surface of the first lens is R1f, and a curvature radius of an image side surface of the first lens is R1r, it is preferable to satisfy Conditional Expression (5). By not allowing the corresponding value of Conditional Expression (5) to be equal to or less than the lower limit, there is an advantage in suppressing astigmatism and distortion. By not allowing the corresponding value of Conditional Expression (5) to be equal to or greater than the upper limit, the absolute value of the curvature radius of the object side surface of the first lens is prevented from becoming excessively small. As a result, there is an advantage in achieving reduction in filter diameter. In order to obtain more favorable characteristics, it is more preferable to satisfy Conditional Expression (5-1), and it is yet more preferable to satisfy Conditional Expression (5-2).

$$1.3 < (R1f + R1r)/(R1f - R1r) < 4.2 \tag{5}$$

$$1.4 < (R1f + R1r)/(R1f - R1r) < 4 \tag{5-1}$$

$$1.5 < (R1f + R1r)/(R1f - R1r) < 3.8 \tag{5-2}$$

It is preferable that the imaging lens of the present embodiment includes a third lens which is disposed adjacent to the image side of the second lens. The third lens is a negative meniscus lens having a convex surface facing toward the object side, or a plano-concave lens of which a surface on the object side is flat. By forming the third lens from the object side as a negative lens, the entrance pupil can be brought closer to the object side. As a result, there is an advantage in ensuring the amount of peripheral light. Further, by forming the third lens from the object side as a negative meniscus lens having a convex surface facing toward the object side, or a plano-concave lens of which a surface on the object side is flat, there is an advantage in suppressing astigmatism and distortion. In the example of FIG. 1, the lens L13 corresponds to the third lens.

Assuming that a curvature radius of the image side surface of the second lens is R2r and a curvature radius of the object side surface of the third lens is R3f, it is preferable to satisfy Conditional Expression (6). By not allowing the corresponding value of Conditional Expression (6) to be equal to or less than the lower limit, there is an advantage in suppressing astigmatism. By not allowing the corresponding value of Conditional Expression (6) to be equal to or greater than the upper limit, there is an advantage in ensuring the amount of peripheral light. In order to obtain more favorable characteristics, it is more preferable to satisfy Conditional Expression (6-1), and it is yet more preferable to satisfy Conditional Expression (6-2).

$$-1 < (R2r - R3f)/(R2r + R3f) < 0.3 \tag{6}$$

$$-0.9 < (R2r - R3f)/(R2r + R3f) < 0.2 \tag{6-1}$$

$$-0.8 < (R2r - R3f)/(R2r + R3f) < 0.1 \tag{6-2}$$

It is preferable that the front group Gf consists of 5 or more lenses and 7 or fewer lenses. By adopting such a configuration, there is an advantage in achieving both reduction in weight of the lens system and favorable optical performance. Further, it is preferable that the rear group Gr is consists of 5 or more lenses and 7 or fewer lenses. By adopting such a configuration, there is an advantage in achieving both reduction in weight of the lens system and favorable optical performance.

Assuming that a focal length of the whole system in a state in which the infinite distance object is in focus is f and a focal length of the rear group Gr in a state in which the infinite distance object is in focus is fr, it is preferable to satisfy Conditional Expression (7). By not allowing the corresponding value of Conditional Expression (7) to be equal to or less than the lower limit, the refractive power of the rear group Gr is prevented from becoming excessively weak. As a result, there is an advantage in correcting field curvature. By not allowing the corresponding value of Conditional Expression (7) from becoming more than the upper limit, the refractive power of the rear group Gr is prevented from becoming excessively strong. As a result, there is an advantage in correcting distortion. In order to obtain more favorable characteristics, it is more preferable to satisfy Conditional Expression (7-1), and it is yet more preferable to satisfy Conditional Expression (7-2).

$$1 < f/fr < 7 \tag{7}$$

$$1.2 < f/fr < 5 \tag{7-1}$$

$$1.4 < f/fr < 4 \tag{7-2}$$

The front group Gf includes an Lfp lens that has a positive refractive power. Assuming that an Abbe number of the Lfp lens based on the d line is vfp, it is preferable to satisfy Conditional Expression (8). By not allowing the corresponding value of Conditional Expression (8) to be equal to or less than the lower limit, it is easy to correct longitudinal chromatic aberration. By not allowing the corresponding value of Conditional Expression (8) to be equal to or greater than the upper limit, there is an advantage in correcting lateral chromatic aberration. In order to obtain more favorable characteristics, it is more preferable to satisfy Conditional Expression (8-1), it is yet more preferable to satisfy Conditional Expression (8-2), it is yet more preferable to satisfy Conditional Expression (8-3), and it is yet more preferable to satisfy Conditional Expression (8-4). In the example of FIG. 1, the lens L14 corresponds to an Lfp lens.

$$16 < vfp < 42 \tag{8}$$

$$16 < vfp < 40 \tag{8-1}$$

$$16 < vfp < 37 \tag{8-2}$$

$$17 < vfp < 35 \tag{8-3}$$

$$18 < vfp < 33 \tag{8-4}$$

It is preferable that the rear group Gr includes an Lrp1 lens that has a positive refractive power. Assuming that a partial dispersion ratio of the Lrp1 lens between the g line and the F line is θgFrp1, and an Abbe number of the Lrp1 lens based on the d line is vrp1, it is preferable to satisfy Conditional Expression (9). Conditional Expression (9) is an expression relating to anomalous dispersibility of the lens material. By satisfying Conditional Expression (9), it is easy to correct the second-order spectrum of chromatic aberration. In order to obtain more favorable characteristics, it is more preferable to satisfy Conditional Expression (9-1), and it is yet more preferable to satisfy Conditional Expression (9-2). In the example of FIG. 1, the lens L23 corresponds to the Lrp1 lens.

$$0.01 < \theta gFrp1 + 0.001618 \times vrp1 - 0.6415 < 0.1 \tag{9}$$

$$0.015 < \theta gFrp1 + 0.001618 \times vrp1 - 0.6415 < 0.07 \tag{9-1}$$

$$0.02 < \theta gFrp1 + 0.001618 \times vrp1 - 0.6415 < 0.04 \tag{9-2}$$

It is preferable that the rear group Gr includes an Lrp2 lens that has a positive refractive power disposed closer to the image side than the Lrp1 lens. Assuming that a partial dispersion ratio of the Lrp2 lens between the g line and the F line is θgFrp2, and an Abbe number of the Lrp2 lens based on the d line is vrp2, it is preferable to satisfy Conditional Expression (10). Conditional Expression (10) is an expression relating to anomalous dispersibility of the lens material. By satisfying Conditional Expression (10), it is easy to correct the second-order spectrum of chromatic aberration. In order to obtain more favorable characteristics, it is more preferable to satisfy Conditional Expression (10-1), and it is yet more preferable to satisfy Conditional Expression (10-2). In the example of FIG. 1, the lens L25 corresponds to the Lrp2 lens.

$$0.01 < \theta gFrp2 + 0.001618 \times vrp2 - 0.6415 < 0.1 \tag{10}$$

$$0.015 < \theta gFrp2 + 0.001618 \times vrp2 - 0.6415 < 0.07 \tag{10-1}$$

$$0.02 < \theta gFrp2 + 0.001618 \times vrp2 - 0.6415 < 0.04 \tag{10-2}$$

It is preferable that the rear group Gr includes an Lrn1 lens that has a negative refractive power. Assuming that a refractive index of the Lrn1 lens on the d line is Nrn1, it is preferable to satisfy Conditional Expression (11). By not allowing the corresponding value of Conditional Expression (11) to be equal to or less than the lower limit, the refractive power of the Lrn1 lens is prevented from becoming excessively weak. As a result, there is an advantage in correcting distortion. By not allowing the corresponding value of Conditional Expression (11) to be equal to or greater than the upper limit, a material of which dispersion is not excessively large can be selected as the Lrn1 lens. As a result, there is an advantage in correcting chromatic aberration. Further, in general, a material having a large dispersion has a large specific gravity. By not allowing the corresponding value of Conditional Expression (11) to be equal to or greater than the upper limit, a material of which specific gravity is not excessively large can be selected as the Lrn1 lens. As a result, there is an advantage in achieving reduction in weight. In order to obtain more favorable characteristics, it is more preferable to satisfy Conditional Expression (11-1), and it is yet more preferable to satisfy Conditional Expression (11-2). In the example of FIG. 1, the lens L21 corresponds to the Lrn1 lens.

$$1.75 < Nrn1 < 2.2 \tag{11}$$

$$1.8 < Nrn1 < 2.1 \tag{11-1}$$

$$1.85 < Nrn1 < 2 \tag{11-2}$$

It is preferable that the rear group Gr includes an Lrn2 lens that has a negative refractive power and is disposed closer to the image side than the Lrn1 lens. Assuming that a refractive index of the Lrn2 lens on the d line is Nrn2, it is preferable to satisfy Conditional Expression (12). By not allowing the corresponding value of Conditional Expression (12) to be equal to or less than the lower limit, the refractive power of the Lrn2 lens is prevented from becoming excessively weak. As a result, there is an advantage in correcting distortion. By not allowing the corresponding value of Conditional Expression (12) to be equal to or greater than the upper limit, a material of which dispersion is not excessively large can be selected as the Lrn2 lens. As a result, there is an advantage in correcting chromatic aberration. Further, in general, a material having a large dispersion has a large specific gravity. By not allowing the corresponding value of Conditional Expression (12) to be equal to or greater than the upper limit, a material of which specific gravity is not excessively large can be selected as the Lrn2 lens. As a result, there is an advantage in achieving reduction in weight. In order to obtain more favorable characteristics, it is more preferable to satisfy Conditional Expression (12-1), and it is yet more preferable to satisfy Conditional Expression (12-2). In the example of FIG. 1, the lens L24 corresponds to the Lrn2 lens.

$$1.8 < Nrn2 < 2.2 \tag{12}$$

$$1.85 < Nrn2 < 2.1 \tag{12-1}$$

$$1.9 < Nrn2 < 2 \tag{12-2}$$

Assuming that a distance on the optical axis from the lens surface closest to the object side to the aperture stop St is Ds, a focal length of the whole system in a state in which the infinite distance object is in focus is f, and a maximum half angle of view of the whole system is ωm, it is preferable to satisfy Conditional Expression (13). By not allowing the corresponding value of Conditional Expression (13) to be equal to or less than the lower limit, there is an advantage in correcting off-axis aberrations, particularly, coma aberration. By not allowing the corresponding value of Conditional Expression (13) to be equal to or greater than the upper limit, there is an advantage in shortening the total length of the lens system. In order to obtain more favorable characteristics, it is more preferable to satisfy Conditional Expression (13-1), and it is yet more preferable to satisfy Conditional Expression (13-2).

$$1.2 < Ds/(f \times \tan \omega m) < 2.8 \tag{13}$$

$$1.35 < Ds/(f \times \tan \omega m) < 2.5 \tag{13-1}$$

$$1.5 < Ds/(f \times \tan \omega m) < 2.2 \tag{13-2}$$

Assuming that a focal length of the whole system in a state in which the infinite distance object is in focus is f and a focal length of the lens group (that is, the focus group) that moves during focusing is fa, it is preferable to satisfy Conditional Expression (14). By not allowing the corresponding value of Conditional Expression (14) to be equal to or less than the lower limit, it is possible to suppress an increase in the amount of movement of the focus group during focusing. As a result, there is an advantage in shortening the total length of the lens system. By not allowing the corresponding value of Conditional Expression (14) from becoming more than the upper limit, the refractive power of the focus group is prevented from becoming excessively strong. As a result, there is an advantage in suppressing fluctuation in aberrations caused by fluctuation in object distance. In order to obtain more favorable characteristics, it is more preferable to satisfy Conditional Expression (14-1), and it is yet more preferable to satisfy Conditional Expression (14-2).

$$1 < f/|fa| < 20 \tag{14}$$

$$1.5 < f/|fa| < 17 \tag{14-1}$$

$$1.8 < f/|fa| < 15 \tag{14-2}$$

Assuming that a distance on the optical axis from the lens surface closest to the object side to the aperture stop St in a state in which the infinite distance object is in focus is Ds and a sum of a distance on the optical axis Z from a lens surface closest to the object side to a lens surface closest to the image side and a back focal length in terms of an air conversion distance in the state where the object at infinity is in focus is TL, it is preferable to satisfy Conditional Expression (15). By not allowing the corresponding value of Conditional Expression (15) to be equal to or less than the lower limit, it is possible to suppress the shortening of the total length of the front group Gf with respect to the total length of the lens system. As a result, there is an advantage in correcting off-axis aberrations, particularly, coma aberration. By not allowing the corresponding value of Conditional Expression (15) to be equal to or greater than the upper limit, it is possible to suppress an increase in total length of the front group Gf with respect to the total length of the lens system. As a result, there is an advantage in achieving reduction in diameter of the lens system. In order to obtain more favorable characteristics, it is more preferable to satisfy Conditional Expression (15-1), and it is yet more preferable to satisfy Conditional Expression (15-2).

$$0.3 < Ds/TL < 0.6 \tag{15}$$

$$0.35 < Ds/TL < 0.55 \tag{15-1}$$

$$0.4 < Ds/TL < 0.5 \tag{15-2}$$

In the imaging lens of the present embodiment, it is preferable that the lens closest to the object side is a spherical lens and the second lens from the object side is an aspherical lens. By disposing the aspherical lens at the second position from the object side, there is an advantage in correcting various aberrations, particularly, coma aberration. By forming the lens closest to the object side having a large lens outer diameter as a spherical lens, there is an advantage in suppressing an increase in cost. In a case where the lens closest to the object side is an aspherical lens, the cost will increase due to the large outer diameter of the lens. In the example of FIG. 1, the lens L11 closest to the object side is a spherical lens, and the second lens L12 from the object side is an aspherical lens.

Assuming that a back focal length of the whole system in terms of air conversion distance in a state in which the infinite distance object is in focus is Bf, a focal length of the whole system in a state in which the infinite distance object is in focus is f, and a maximum half angle of view of the whole system is ωm, it is preferable to satisfy Conditional Expression (16). By not allowing the corresponding value of Conditional Expression (16) to be equal to or less than the lower limit, the back focal length is prevented from becoming excessively short with respect to the image circle. As a result, there is an advantage in achieving reduction in diameter of the rear group Gr. By not allowing the corresponding value of Conditional Expression (16) to be equal to or greater than the upper limit, the back focal length is prevented from becoming excessively long with respect to the image circle. As a result, there is an advantage in shortening the total length of the lens system. In order to obtain more favorable characteristics, it is more preferable to satisfy Conditional Expression (16-1), it is yet more preferable to satisfy Conditional Expression (16-2), it is yet more preferable to satisfy Conditional Expression (16-3), and it is yet more preferable to satisfy Conditional Expression (16-4).

$$0.70 < Bf/(f \times \tan \omega m) < 1.4 \tag{16}$$

$$0.72 < Bf/(f \times \tan \omega m) < 1.4 \tag{16-1}$$

$$0.74 < Bf/(f \times \tan \omega m) < 1.3 \tag{16-2}$$

$$0.77 < Bf/(f \times \tan \omega m) < 1.3 \tag{16-3}$$

$$0.82 < Bf/(f \times \tan \omega m) < 1.25 \tag{16-4}$$

In a configuration in which at least a part of the front group Gf is a focus group, it is preferable that the focus group consists of one lens. By adopting such a configuration, there is an advantage in achieving reduction in size of the focus unit. Examples 1 to 4 to be described later correspond to this configuration.

the above-mentioned preferable configurations and available configurations including the configurations relating to Conditional Expressions may be any combination, and it is preferable to optionally adopt the configurations in accordance with required specification. It should be noted that Conditional Expressions that the imaging lens of the present disclosure preferably satisfies are not limited to Conditional Expressions described in the form of Expression, and the lower limit and the upper limit are selected from the preferable, more preferable, and yet more preferable conditional expressions. Conditional Expressions may include all conditional expressions obtained through optional combinations.

For example, according to a preferred embodiment of the imaging lens of the present disclosure, the imaging lens consists of a front group Gf, an aperture stop St, and a rear group Gr that has a positive refractive power, in order from the object side to the image side, and satisfies Conditional Expressions (1), (2) and (3).

Next, examples of the imaging lens of the present disclosure will be described, with reference to the drawings. The reference numerals attached to the lenses in the cross-sectional views of each example are used independently for each example in order to avoid complication of description and drawings due to an increase in number of digits of the reference numerals. Therefore, even in a case where common reference numerals are attached in the drawings of different examples, components do not necessarily have a common configuration.

EXAMPLE 1

Figure 2:
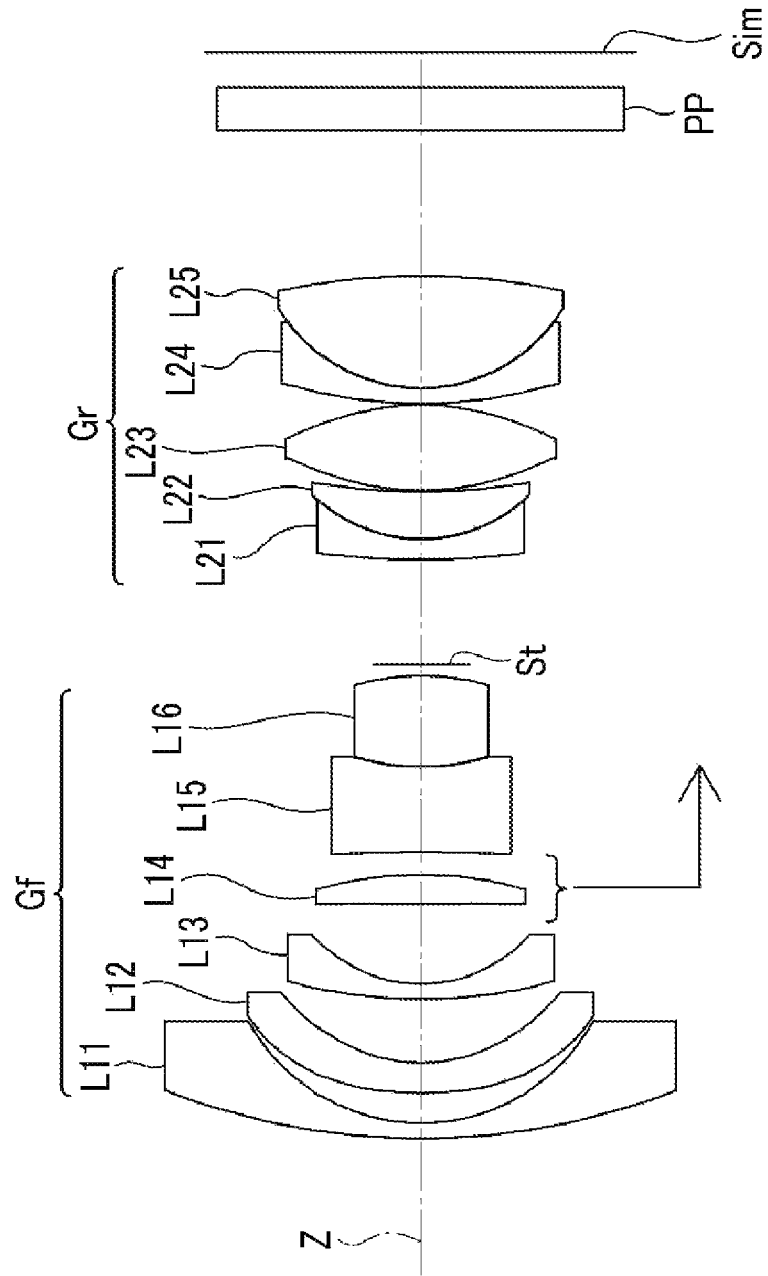
FIG. 2 is a cross-sectional view showing a configuration of an imaging lens of Example 1.

FIG. 2 is a cross-sectional view of a configuration of the imaging lens of Example 1. Since the basic illustration method of FIG. 2 is the same as that of FIG. 1, some duplicate descriptions will not be repeated here. The imaging lens of Example 1 consists of a front group Gf, an aperture stop St, and a rear group Gr that has a positive refractive power, in order from the object side to the image side. The front group Gf consists of lenses L11 to L16, in order from the object side to the image side. The rear group Gr consists of lenses L21 to L25. During focusing from the infinite distance object to the close range object, the lens L14 moves toward the image side, and the other lenses remain stationary with respect to the image plane Sim. The right-pointing arrow below the lens L14 in FIG. 2 indicates that the lens L14 moves toward the image side (that is, the lens L14 is the focus group) during focusing from the infinite distance object to the close range object.

Regarding the imaging lens of Example 1, Table 1 shows basic lens data, Table 2 shows specification, and Table 3 shows aspherical coefficients thereof. Table 1 is noted as follows. The column of Sn shows surface numbers in a case where the surface closest to the object side is the first surface and the number is increased one by one toward the image side. The column of R shows a curvature radius of each surface. The column of D shows a surface spacing between each surface and the surface adjacent to the image side on the optical axis. The column of Nd shows a refractive index of each component at the d line. The column of vd shows an Abbe number of each component based on the d line. The column of θgF shows a partial dispersion ratio of each component between the g line and the F line. The column of ΔθgF shows an anomalous dispersibility of each component. In the present specification, assuming that the Abbe number based on the d line is vd and the partial dispersion ratio between the g line and the F line is θgF for each component, the anomalous dispersibility ΔθgF is defined by the following expression.

$$\Delta\theta gF = \theta gF + 0.001618 \times vd - 0.6415$$

In Table 1, the sign of the curvature radius of the convex surface facing toward the object side is positive and the sign of the curvature radius of the convex surface facing toward the image side is negative. Table 1 also shows the aperture stop St and the optical member PP, and in the column of the surface number of the surface corresponding to the aperture stop St, the surface number and (St) are noted. A value at the bottom cell of D indicates a spacing between the image plane Sim and the surface closest to the image side in the table.

Table 2 shows a focal length f of the whole system, a back focal length Bf in terms of the air conversion distance of the whole system, and an F number FNo., and a maximum total angle of view of 2ωm. [°] in the cell of 2ωm indicates that the unit thereof is a degree. The values shown in Table 2 are values in the case of using the d line as a reference in a state where the infinite distance object is in focus.

In Table 1, a reference sign * is attached to surface numbers of aspherical surfaces, and numerical values of the paraxial curvature radius are written into the column of the curvature radius of the aspherical surface. In Table 3, the row of Sn shows surface numbers of the aspherical surfaces, and the rows of KA and Am (m is an integer of 3 or more) shows numerical values of the aspherical surface coefficients for each aspherical surface. The "E±n" (n: an integer) in numerical values of the aspherical coefficients of Table 3 indicates "×10$^{\pm n}$". KA and Am are the aspherical coefficients in the aspherical surface expression represented by the following expression.

$$Zd = C \times h^2 / \{1 + (1 - KA \times C^2 \times h^2)^{1/2}\} + \Sigma Am \times h^m$$

Here,

Zd is an aspherical surface depth (a length of a perpendicular from a point on an aspherical surface at height h to a plane that is perpendicular to the optical axis and that is in contact with the vertex of the aspherical surface), h is a height (a distance from the optical axis to the lens surface), C is an inverse of the paraxial curvature radius, KA and Am are aspherical coefficients, and Σ in the aspherical surface expression means the sum with respect to m.

In the data of each table, degrees are used as a unit of an angle, and millimeters (mm) are used as a unit of a length, but appropriate different units may be used since the optical system can be used even in a case where the system is enlarged or reduced in proportion. Each of the following tables shows numerical values rounded off to predetermined decimal places.

TABLE 1

| Sn | R | D | Nd | vd | θgF | ΔθgF |
|---|---|---|---|---|---|---|
| 1 | 47.31611 | 1.000 | 1.64000 | 60.08 | 0.53704 | −0.00725 |
| 2 | 13.15790 | 2.000 | | | | |
| *3 | 29.47403 | 2.000 | 1.58313 | 59.38 | 0.54237 | −0.00305 |
| *4 | 11.41031 | 4.189 | | | | |
| 5 | 33.85309 | 1.000 | 1.49700 | 81.61 | 0.53887 | 0.02941 |
| 6 | 9.64903 | 5.290 | | | | |

TABLE 1-continued

| Sn | R | D | Nd | vd | θgF | ΔθgF |
|---|---|---|---|---|---|---|
| *7 | 79.97125 | 1.912 | 1.68948 | 31.02 | 0.59874 | 0.00743 |
| *8 | −31.88721 | 1.500 | | | | |
| 9 | −129.82787 | 5.652 | 1.53996 | 59.46 | 0.54418 | −0.00111 |
| 10 | 15.35252 | 6.006 | 1.52841 | 76.45 | 0.53954 | 0.02174 |
| 11 | −15.86867 | 0.750 | | | | |
| 12(St) | ∞ | 6.858 | | | | |
| 13 | 56.42018 | 1.345 | 1.91082 | 35.25 | 0.58224 | −0.00223 |
| 14 | 10.34556 | 3.123 | 1.74950 | 35.33 | 0.58189 | −0.00245 |
| 15 | 43.42567 | 0.100 | | | | |
| *16 | 18.66865 | 5.643 | 1.49710 | 81.56 | 0.53848 | 0.02894 |
| *17 | −15.98781 | 0.100 | | | | |
| 18 | 32.53082 | 1.000 | 1.91082 | 35.25 | 0.58224 | −0.00223 |
| 19 | 11.11491 | 7.426 | 1.49700 | 81.61 | 0.53887 | 0.02941 |
| 20 | −45.34171 | 9.600 | | | | |
| 21 | ∞ | 2.850 | 1.51680 | 64.20 | 0.53430 | |
| 22 | ∞ | 2.329 | | | | |

TABLE 2

| | |
|---|---|
| f | 8.245 |
| Bf | 13.808 |
| FNo. | 3.60 |
| 2 ωm(°) | 123.6 |

TABLE 3

| | Sn | |
|---|---|---|
| | 3 | 4 |
| KA | 1.0000000E+00 | 1.0000000E+00 |
| A3 | 0.0000000E+00 | 0.0000000E+00 |
| A4 | 3.1828316E−04 | 1.4279260E−04 |
| A5 | −1.6229715E−05 | −9.3980682E−06 |
| A6 | −1.1899634E−06 | −1.3213442E−06 |
| A7 | 6.9928956E−08 | −2.9808333E−08 |
| A8 | 6.5692759E−09 | −1.1042903E−08 |
| A9 | −3.8726298E−11 | 1.1461441E−09 |
| A10 | −3.2338945E−11 | 2.3518890E−10 |
| A11 | 1.2008502E−12 | −5.4981548E−12 |
| A12 | 4.1315047E−14 | −9.5738019E−13 |

| | Sn | | | |
|---|---|---|---|---|
| | 7 | 8 | 16 | 17 |
| KA | 1.0000000E+00 | 1.0000000E+00 | 1.0000000E+00 | 1.0000000E+00 |
| A4 | −2.5328517E−04 | −1.6878250E−04 | 5.6317909E−06 | 1.0552321E−04 |
| A6 | 1.7517740E−06 | 1.7114963E−06 | −9.2577997E−08 | −2.8300559E−07 |
| A8 | 2.0597617E−08 | 4.8979619E−09 | 4.3961119E−10 | 2.1421643E−09 |
| A10 | −1.8405069E−10 | −1.2961657E−10 | −2.0075502E−11 | −4.4004649E−11 |

Figure 3:
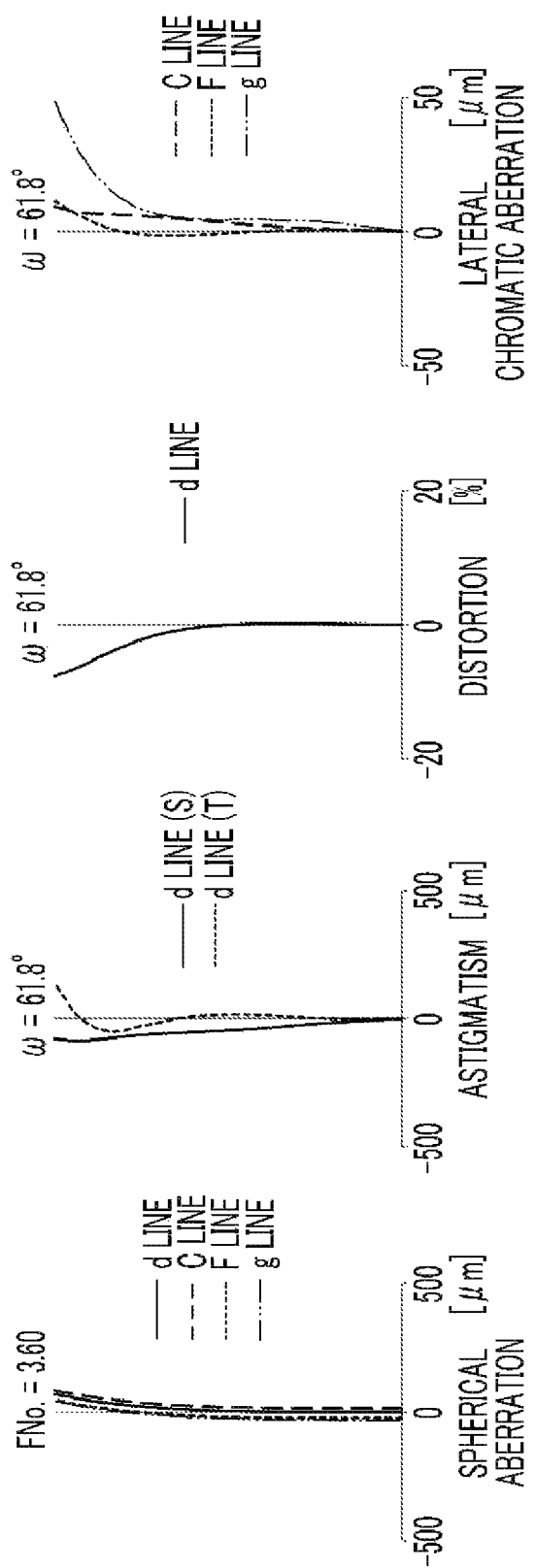
FIG. 3 is a diagram showing aberrations such as spherical aberration, astigmatism, distortion, and lateral chromatic aberration of the imaging lens of Example 1.
Figure 4:
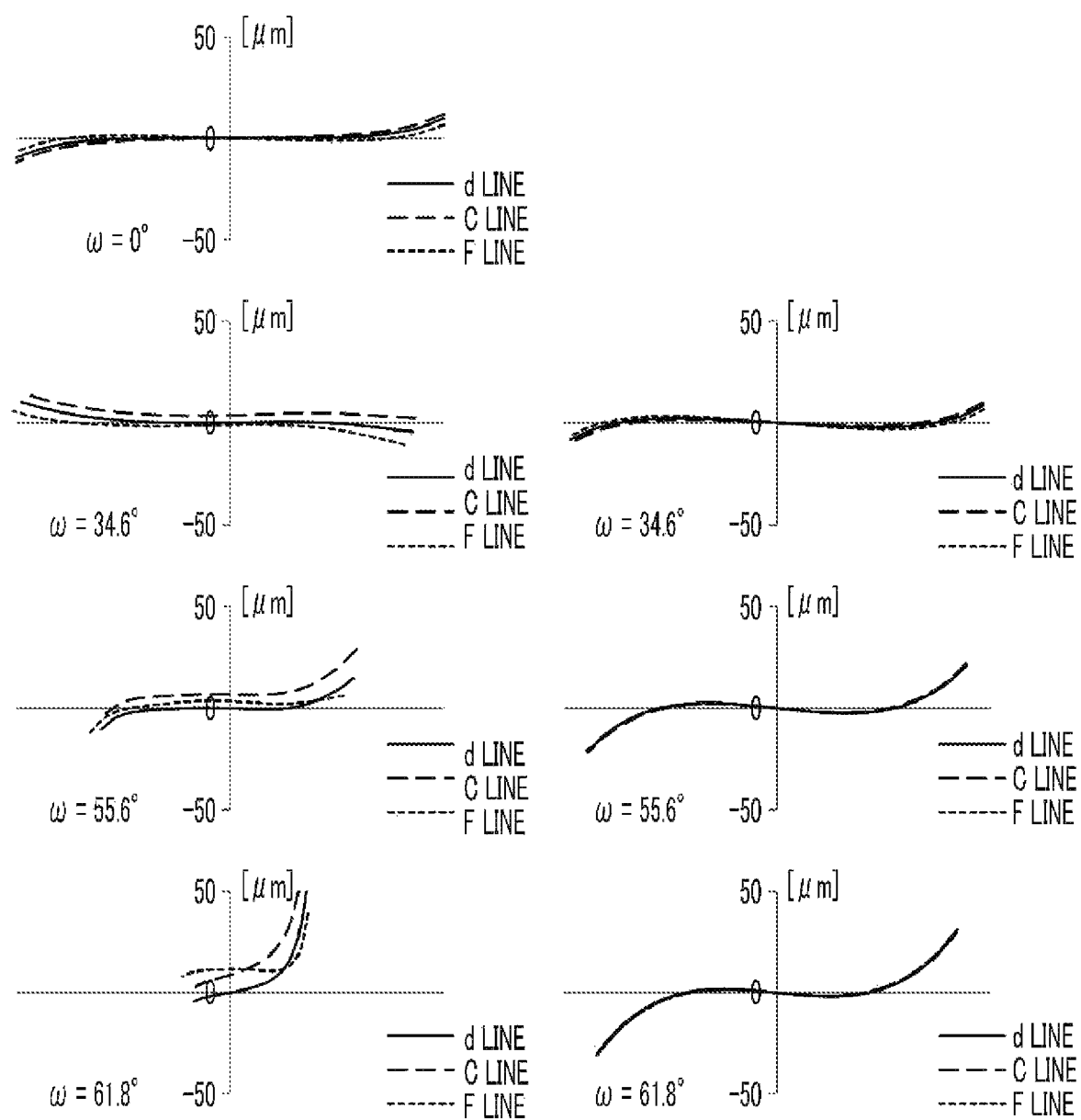
FIG. 4 is a diagram showing lateral aberrations of the imaging lens of Example 1.

FIGS. 3 and 4 show aberration diagrams of the imaging lens of Example 1 in a state in which the infinite distance object is in focus. FIG. 3 shows, in order from the left, spherical aberration, astigmatism, distortion, and lateral chromatic aberration. In the spherical aberration diagram, aberrations at the d line, the C line, the F line, and the g line are respectively indicated by the solid line, the long broken line, the short broken line, and the chain double-broken line. In the astigmatism diagram, aberration in the sagittal direction at the d line is indicated by the solid line, and aberration in the tangential direction at the d line is indicated by the short broken line. In the distortion diagram, aberration at the d line is indicated by the solid line. In the lateral chromatic aberration diagram, aberrations at the C line, the F line, and the g line are respectively indicated by the long broken line, the short broken line, and the chain double-broken line. In the spherical aberration diagram, a value of the F number is shown after "FNo.=". In other aberration diagrams, a value of the half angle of view corresponding to the upper end of the vertical axis is shown after "ω=".

FIG. 4 shows a lateral aberration diagram for each angle of view. In FIG. 4, the left column shows lateral aberrations in the tangential direction, and the right column shows lateral aberrations in the sagittal direction. In FIG. 4, aberrations at the d line, the C line, and the F line are indicated by a solid line, a long broken line, and a short broken line, respectively. In the lateral aberration diagram, a value of the half angle of view is shown after "ω=".

Symbols, meanings, description methods, and illustration methods of the respective data pieces according to Example 1 are the same as those in the following examples unless otherwise specified. Therefore, in the following description, repeated description will not be given.

EXAMPLE 2

Figure 5:
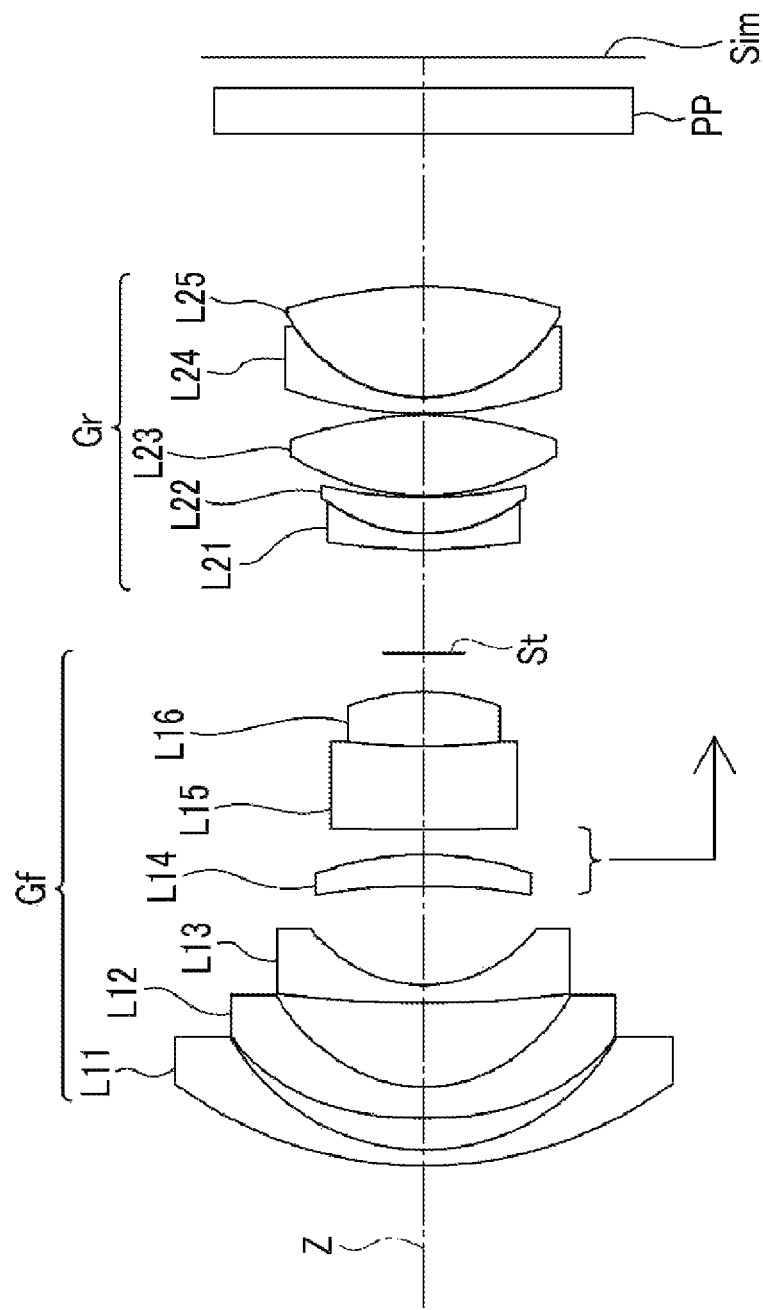
FIG. 5 is a cross-sectional view showing a configuration of an imaging lens of Example 2.

FIG. 5 is a cross-sectional view of a configuration of the imaging lens of Example 2. The imaging lens of Example 2 consists of a front group Gf, an aperture stop St, and a rear group Gr that has a positive refractive power, in order from the object side to the image side. The front group Gf consists of lenses L11 to L16, in order from the object side to the image side. The rear group Gr consists of lenses L21 to L25. During focusing from the infinite distance object to the close range object, the lens L14 moves toward the image side, and the other lenses remain stationary with respect to the image plane Sim.

Figure 6:
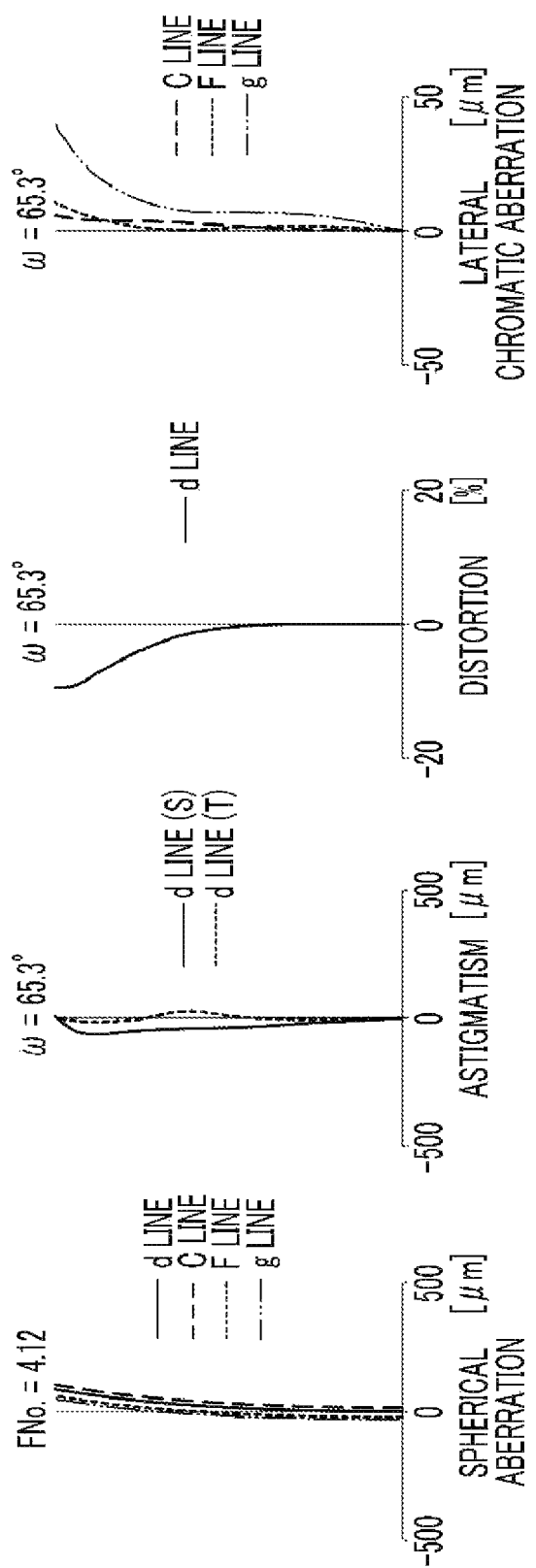
FIG. 6 is a diagram showing aberrations such as spherical aberration, astigmatism, distortion, and lateral chromatic aberration of the imaging lens of Example 2.
Figure 7:
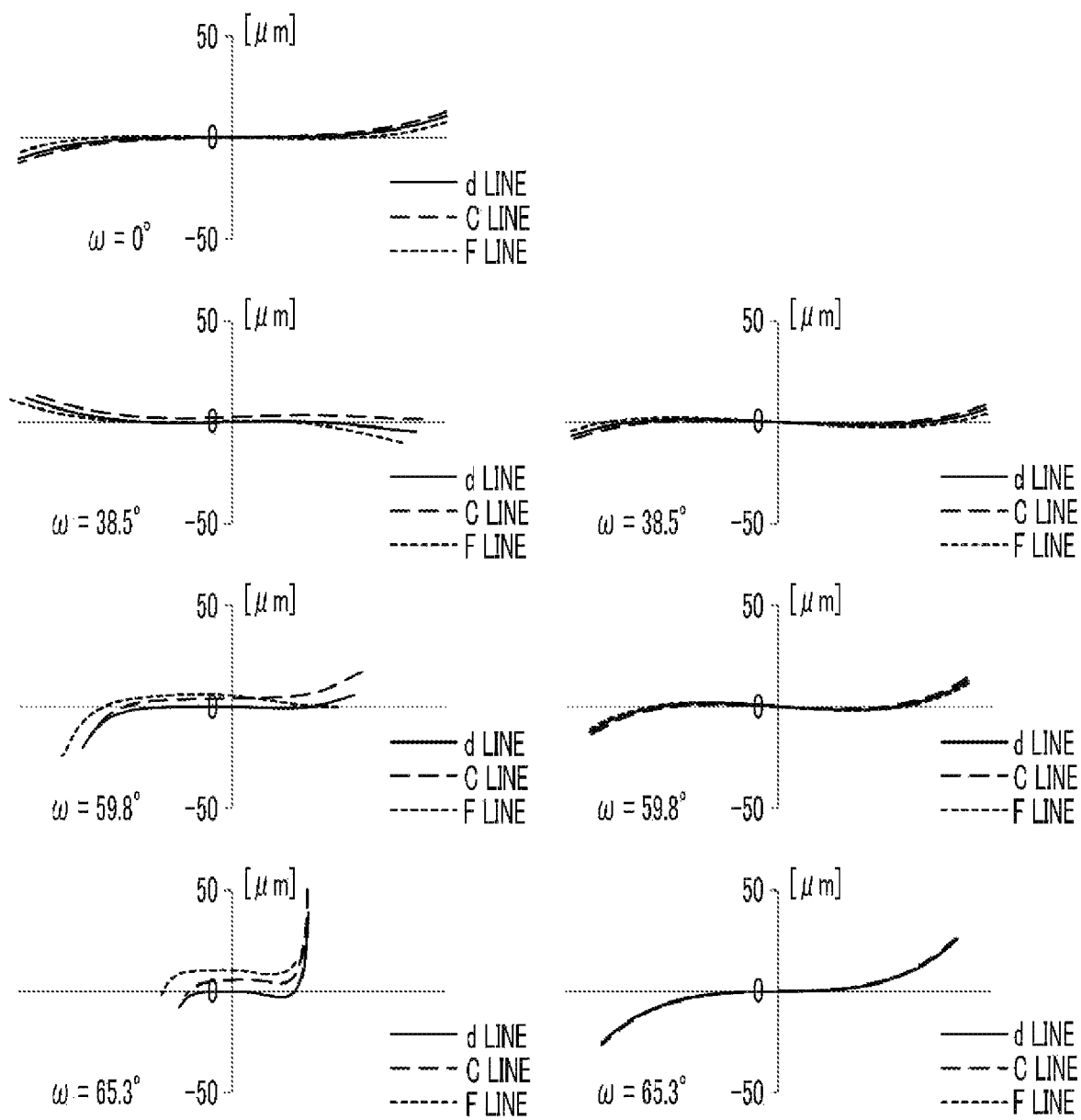
FIG. 7 is a diagram showing lateral aberrations of the imaging lens of Example 2.

Regarding the imaging lens of Example 2, Table 4 shows basic lens data, Table 5 shows specification, and Table 6 shows aspherical coefficients thereof. Further, FIGS. 6 and 7 show aberration diagrams in a state in which the infinite distance object is in focus.

TABLE 4

| Sn | R | D | Nd | vd | θgF | ΔθgF |
|---|---|---|---|---|---|---|
| 1 | 27.49041 | 1.000 | 1.88300 | 39.22 | 0.5729 | −0.00516 |
| 2 | 14.54722 | 2.000 | | | | |

TABLE 4-continued

| Sn | R | D | Nd | vd | θgF | ΔθgF |
|---|---|---|---|---|---|---|
| *3 | 36.50742 | 1.945 | 1.58313 | 59.38 | 0.5424 | −0.00305 |
| *4 | 10.52919 | 5.235 | | | | |
| 5 | 73.85866 | 1.134 | 1.49700 | 81.61 | 0.5389 | 0.02941 |
| 6 | 9.21745 | 6.143 | | | | |
| *7 | −122.23470 | 2.000 | 1.68948 | 31.02 | 0.5987 | 0.00743 |
| *8 | −24.05731 | 1.576 | | | | |
| 9 | 195.80335 | 5.222 | 1.51742 | 52.43 | 0.5565 | −0.00018 |
| 10 | 40.62545 | 3.386 | 1.48749 | 70.44 | 0.5306 | 0.00309 |
| 11 | −13.89337 | 2.349 | | | | |
| 12(St) | ∞ | 6.502 | | | | |
| 13 | 42.71303 | 1.000 | 1.88300 | 39.22 | 0.5729 | −0.00516 |
| 14 | 10.75653 | 2.258 | 1.66382 | 27.35 | 0.6320 | 0.03470 |
| 15 | 29.29680 | 0.100 | | | | |
| *16 | 15.64951 | 5.042 | 1.49710 | 81.56 | 0.5385 | 0.02894 |
| *17 | −19.77003 | 0.100 | | | | |
| 18 | 26.02045 | 1.000 | 1.92119 | 23.96 | 0.6203 | 0.01752 |
| 19 | 10.03141 | 6.914 | 1.49700 | 81.61 | 0.5389 | 0.02941 |
| 20 | −29.63771 | 9.600 | | | | |
| 21 | ∞ | 2.850 | 1.51680 | 64.20 | 0.5343 | |
| 22 | ∞ | 1.959 | | | | |

TABLE 5

| | |
|---|---|
| f | 7.216 |
| Bf | 13.438 |
| FNo. | 4.12 |
| 2 ωm(°) | 130.6 |

TABLE 6

| | Sn | |
|---|---|---|
| | 3 | 4 |
| KA | 1.0000000E+00 | 1.0000000E+00 |
| A3 | 0.0000000E+00 | 0.0000000E+00 |
| A4 | 3.4999385E−04 | 2.1120370E−04 |
| A5 | −1.6332783E−05 | −3.8399732E−06 |
| A6 | −1.6293508E−06 | −2.8835012E−06 |
| A7 | 4.0132127E−08 | 2.0985657E−07 |
| A8 | 9.9620257E−09 | −4.4572765E−08 |
| A9 | −4.4870263E−11 | −5.8327904E−10 |
| A10 | −3.7960007E−11 | 4.5506265E−10 |
| A11 | 9.1164279E−13 | 7.6928615E−12 |
| A12 | 4.7878588E−14 | −1.5083997E−12 |

| | Sn | | | |
|---|---|---|---|---|
| | 7 | 8 | 16 | 17 |
| KA | 1.0000000E+00 | 1.0000000E+00 | 1.0000000E+00 | 1.0000000E+00 |
| A4 | −2.4268811E−04 | −1.3781249E−04 | 2.4906463E−05 | 1.1732583E−04 |
| A6 | 1.5804157E−06 | 1.2978156E−06 | −2.7274631E−07 | −5.0927337E−07 |
| A8 | 1.4223401E−08 | 4.0911732E−09 | −4.7723308E−10 | 4.1065031E−09 |
| A10 | −5.2479914E−12 | 9.4452392E−12 | −2.8411922E−11 | −8.5318413E−11 |

EXAMPLE 3

Figure 8:
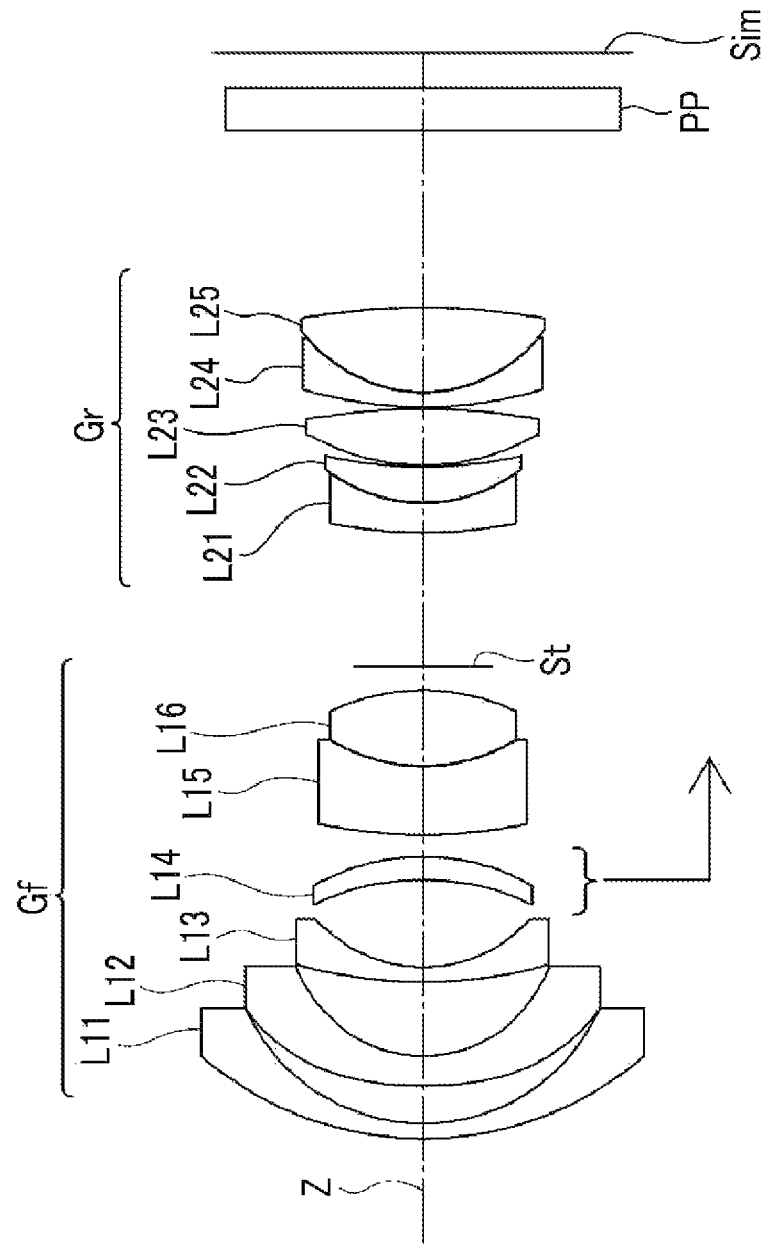
FIG. 8 is a cross-sectional view showing a configuration of an imaging lens of Example 3.

FIG. 8 is a cross-sectional view of a configuration of the imaging lens of Example 3. The imaging lens of Example 3 consists of a front group Gf, an aperture stop St, and a rear group Gr that has a positive refractive power, in order from the object side to the image side. The front group Gf consists of lenses L11 to L16, in order from the object side to the image side. The rear group Gr consists of lenses L21 to L25. During focusing from the infinite distance object to the close range object, the lens L14 moves toward the image side, and the other lenses remain stationary with respect to the image plane Sim.

Figure 9:
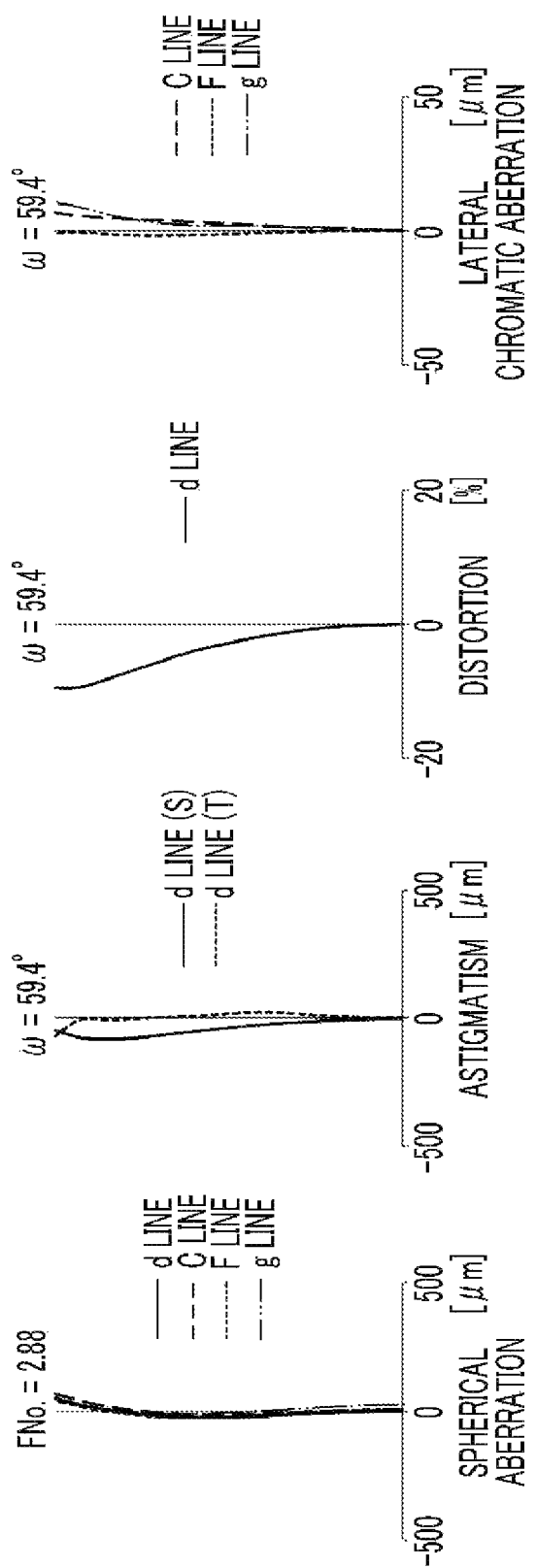
FIG. 9 is a diagram showing aberrations such as spherical aberration, astigmatism, distortion, and lateral chromatic aberration of the imaging lens of Example 3.
Figure 10:
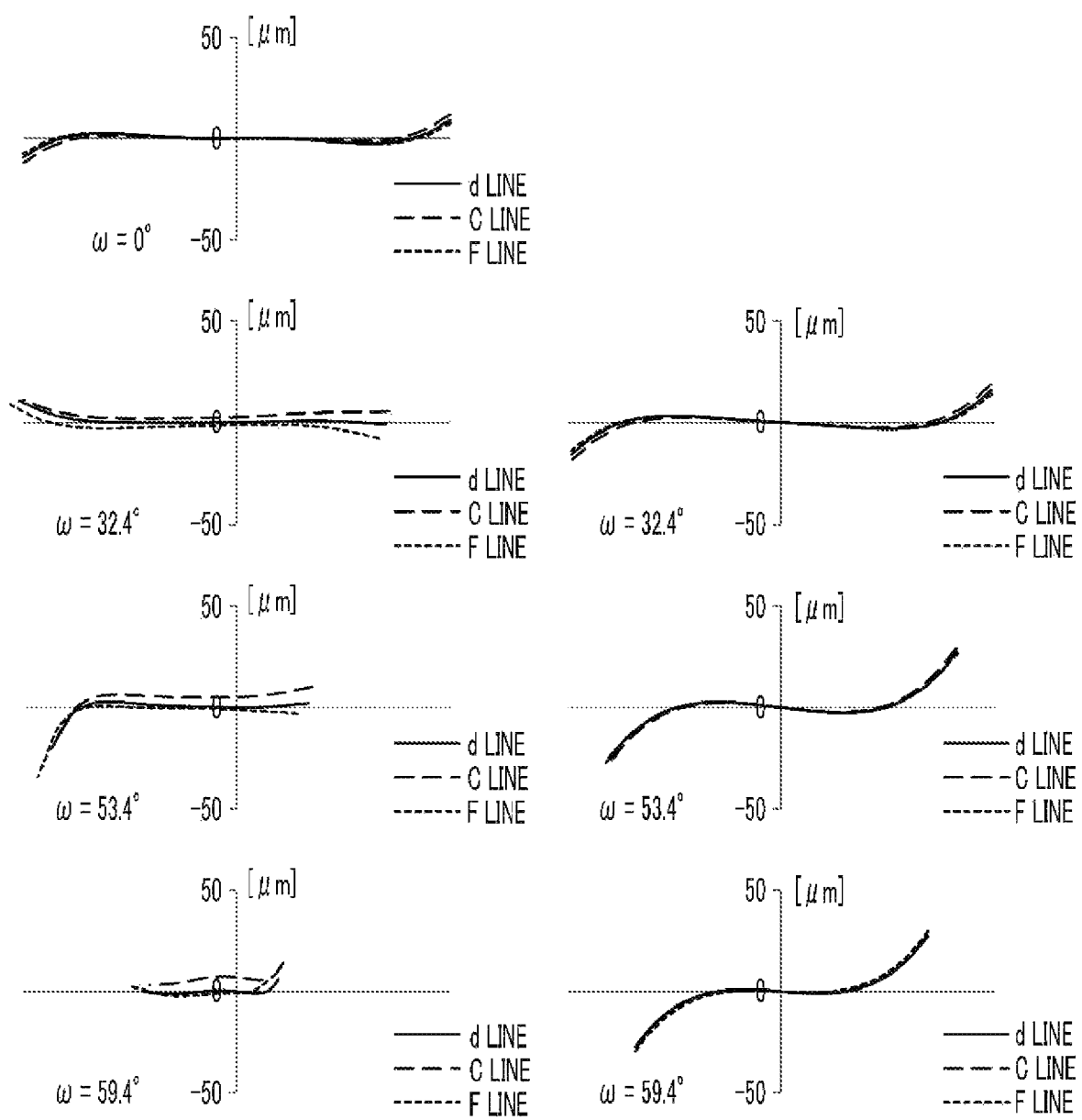
FIG. 10 is a diagram showing lateral aberrations of the imaging lens of Example 3.

Regarding the imaging lens of Example 3, Table 7 shows basic lens data, Table 8 shows specification, and Table 9 shows aspherical coefficients thereof. Further, FIGS. 9 and 10 show aberration diagrams in a state in which the infinite distance object is in focus.

TABLE 7

| Sn | R | D | Nd | vd | θgF | ΔθgF |
|---|---|---|---|---|---|---|
| 1 | 23.04646 | 1.000 | 1.88300 | 40.76 | 0.5668 | −0.00876 |
| 2 | 13.15783 | 2.559 | | | | |
| *3 | 31.83904 | 2.000 | 1.58313 | 59.38 | 0.5424 | −0.00305 |
| *4 | 9.97237 | 4.962 | | | | |
| 5 | 31.76571 | 1.000 | 1.49700 | 81.54 | 0.5375 | 0.02791 |
| 6 | 9.75554 | 5.843 | | | | |
| *7 | −21.62845 | 1.543 | 1.68948 | 31.02 | 0.5987 | 0.00743 |
| *8 | −17.14356 | 1.500 | | | | |
| 9 | 34.59414 | 4.629 | 1.51742 | 52.43 | 0.5565 | −0.00018 |
| 10 | 12.27041 | 5.097 | 1.48749 | 70.24 | 0.5301 | 0.00222 |
| 11 | −14.42203 | 1.572 | | | | |
| 12(St) | ∞ | 8.937 | | | | |
| 13 | 32.89857 | 2.000 | 1.88300 | 40.76 | 0.5668 | −0.00876 |
| 14 | 10.86005 | 2.430 | 1.66382 | 27.35 | 0.6320 | 0.03470 |
| 15 | 30.83061 | 0.100 | | | | |
| *16 | 15.92646 | 3.813 | 1.49710 | 81.56 | 0.5385 | 0.02894 |
| *17 | −33.90404 | 0.100 | | | | |
| 18 | 28.30507 | 1.000 | 1.92119 | 23.96 | 0.6203 | 0.01752 |
| 19 | 10.20984 | 5.680 | 1.49700 | 81.54 | 0.5375 | 0.02791 |
| 20 | −47.22514 | 11.906 | | | | |
| 21 | ∞ | 2.850 | 1.51680 | 64.20 | 0.5343 | |
| 22 | ∞ | 2.386 | | | | |

TABLE 8

| | |
|---|---|
| f | 9.273 |
| Bf | 16.171 |
| FNo. | 2.88 |
| 2 ωm(°) | 118.8 |

Table 9

| | Sn | |
|---|---|---|
| | 3 | 4 |
| KA | 1.0000000E+00 | 1.0000000E+00 |
| A3 | 0.0000000E+00 | 0.0000000E+00 |
| A4 | 2.9903819E−04 | 2.8939050E−04 |
| A5 | −1.4083778E−05 | −3.1210560E−06 |
| A6 | −1.2770152E−06 | −3.1473533E−06 |
| A7 | 7.1766822E−08 | 2.9187940E−07 |
| A8 | 6.9802344E−09 | −1.6362540E−08 |
| A9 | −6.2210845E−11 | 7.4726634E−10 |
| A10 | −3.6741860E−11 | 7.6230249E−11 |
| A11 | 8.4409839E−13 | −1.3385784E−11 |
| A12 | 3.8980255E−14 | 1.9798736E−12 |

| | | Sn | | |
|---|---|---|---|---|
| | 7 | 8 | 16 | 17 |
| KA | 1.0000000E+00 | 1.0000000E+00 | 1.0000000E+00 | 1.0000000E+00 |
| A4 | −1.8614883E−04 | −1.2821806E−04 | 2.5425175E−05 | 6.6694127E−05 |
| A6 | 1.3493076E−06 | 1.3201336E−06 | −1.4845341E−07 | −1.7974378E−07 |
| A8 | 7.1095847E−09 | −3.2913636E−09 | 2.4701372E−09 | 7.2336736E−10 |
| A10 | −2.6240897E−10 | −1.3177004E−10 | −3.5731229E−11 | −3.5616886E−11 |

EXAMPLE 4

Figure 11:
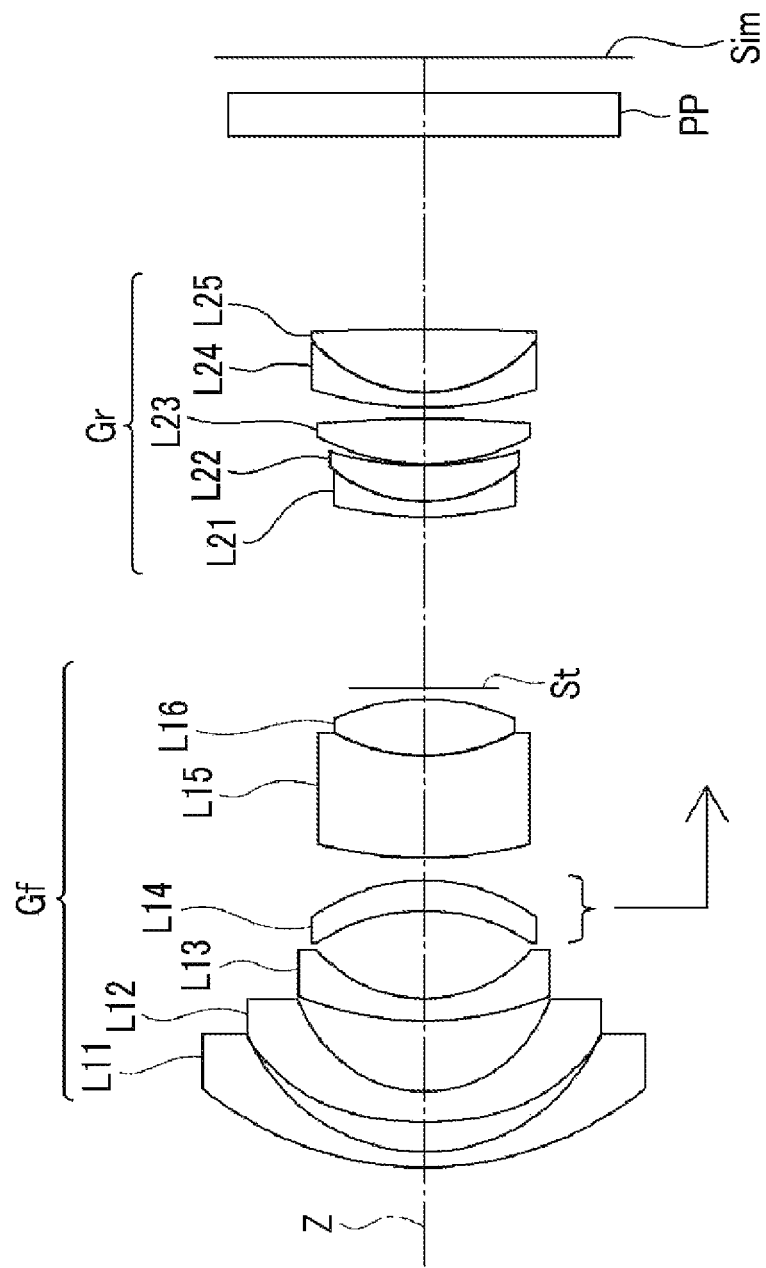
FIG. 11 is a cross-sectional view showing a configuration of an imaging lens of Example 4.

FIG. 11 is a cross-sectional view of a configuration of the imaging lens of Example 4. The imaging lens of Example 4 consists of a front group Gf, an aperture stop St, and a rear group Gr that has a positive refractive power, in order from the object side to the image side. The front group Gf consists of lenses L11 to L16, in order from the object side to the image side. The rear group Gr consists of lenses L21 to L25. During focusing from the infinite distance object to the close range object, the lens L14 moves toward the image side, and the other lenses remain stationary with respect to the image plane Sim.

Figure 12:
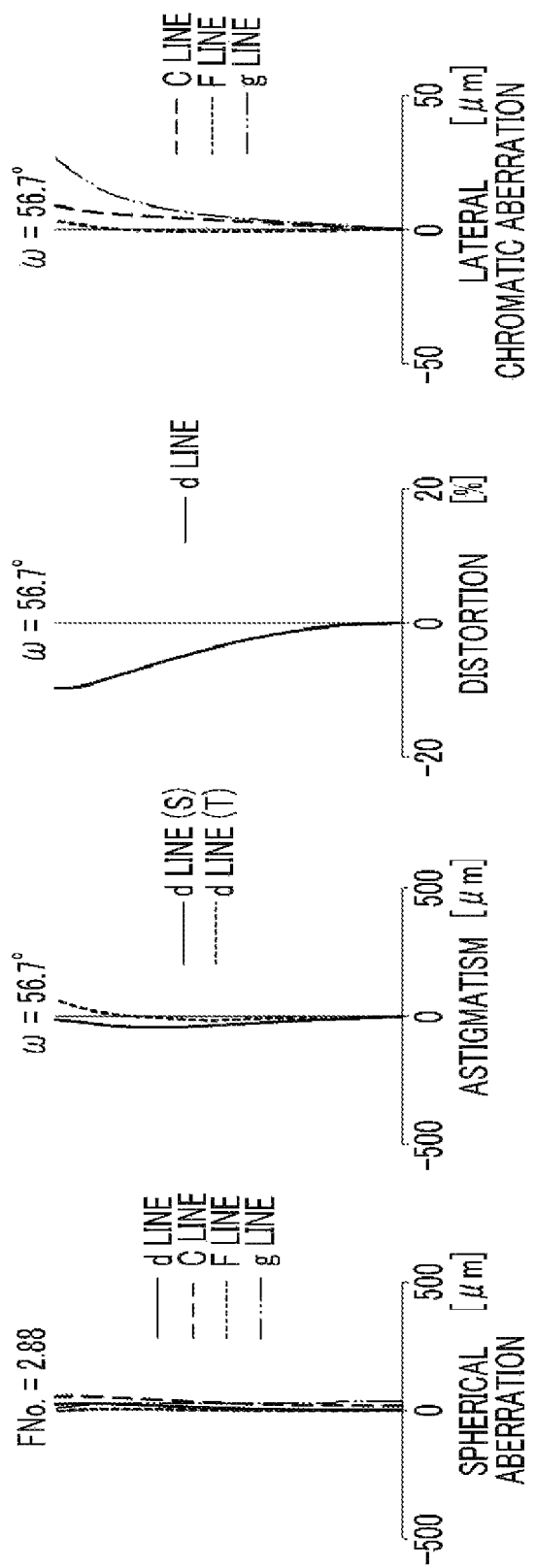
FIG. 12 is a diagram showing aberrations such as spherical aberration, astigmatism, distortion, and lateral chromatic aberration of the imaging lens of Example 4.
Figure 13:
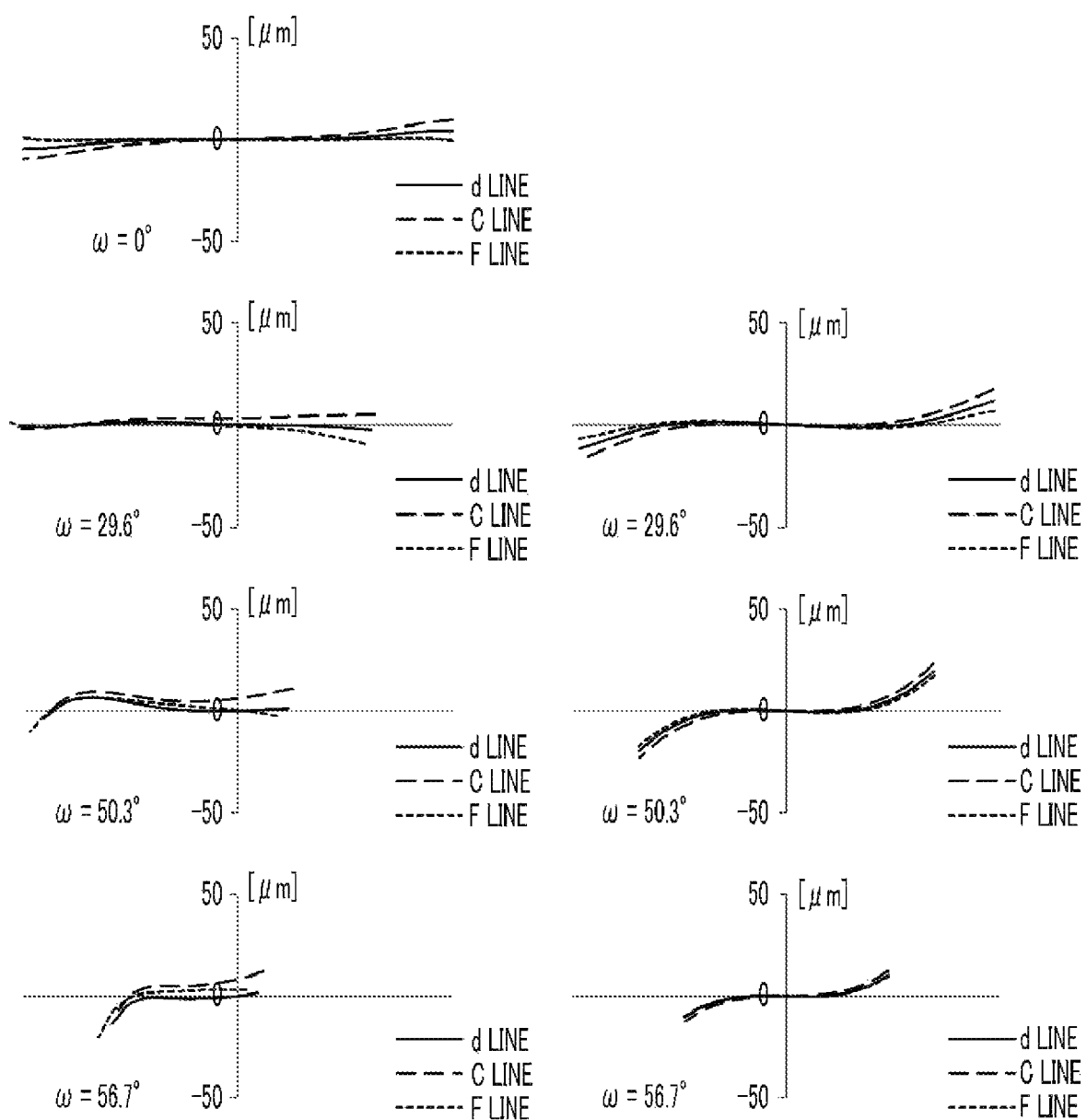
FIG. 13 is a diagram showing lateral aberrations of the imaging lens of Example 4.

Regarding the imaging lens of Example 4, Table 10 shows basic lens data, Table 11 shows specification, and Table 12 shows aspherical coefficients thereof. Further, FIGS. 12 and 13 show aberration diagrams in a state in which the infinite distance object is in focus.

TABLE 10

| Sn | R | D | Nd | vd | θgF | ΔθgF |
|---|---|---|---|---|---|---|
| 1 | 24.28354 | 1.000 | 1.88300 | 39.22 | 0.5729 | −0.00516 |
| 2 | 13.15783 | 2.000 | | | | |
| *3 | 27.88073 | 2.000 | 1.58313 | 59.38 | 0.5424 | −0.00305 |
| *4 | 9.92470 | 4.659 | | | | |
| 5 | 23.25815 | 1.442 | 1.51633 | 64.14 | 0.5353 | −0.00241 |

TABLE 10-continued

| Sn | R | D | Nd | vd | θgF | ΔθgF |
|---|---|---|---|---|---|---|
| 6 | 9.95333 | 5.716 | | | | |
| *7 | −14.81340 | 2.000 | 1.68948 | 31.02 | 0.5987 | 0.00743 |
| *8 | −13.67934 | 1.500 | | | | |
| 9 | 29.61860 | 6.740 | 1.51742 | 52.43 | 0.5565 | −0.00018 |
| 10 | 13.32631 | 3.711 | 1.48749 | 70.44 | 0.5306 | 0.00309 |
| 11 | −15.14585 | 0.750 | | | | |
| 12(St) | ∞ | 11.266 | | | | |
| 13 | 25.81880 | 1.000 | 1.88300 | 39.22 | 0.5729 | −0.00516 |
| 14 | 10.22578 | 2.373 | 1.71736 | 29.52 | 0.6048 | 0.01109 |
| 15 | 23.26511 | 0.114 | | | | |
| *16 | 15.84898 | 2.978 | 1.49710 | 81.56 | 0.5385 | 0.02894 |
| *17 | −58.59912 | 0.721 | | | | |
| 18 | 24.75085 | 1.000 | 1.96300 | 24.11 | 0.6213 | 0.01877 |
| 19 | 10.14308 | 4.134 | 1.52841 | 76.45 | 0.5395 | 0.02174 |
| 20 | −221.81751 | 12.647 | | | | |
| 21 | ∞ | 2.850 | 1.51680 | 64.20 | 0.5343 | |
| 22 | ∞ | 2.385 | | | | |

TABLE 11

| f | 10.341 |
|---|---|
| Bf | 16.911 |
| FNo. | 2.88 |
| 2 ωm(°) | 113.4 |

TABLE 12

| | Sn | |
|---|---|---|
| | 3 | 4 |
| KA | 1.0000000E+00 | 1.0000000E+00 |
| A3 | 0.0000000E+00 | 0.0000000E+00 |
| A4 | 2.6851326E−04 | 2.6098418E−04 |
| A5 | −1.1135318E−05 | 1.3361855E−06 |
| A6 | −1.3372071E−06 | −3.2692693E−06 |
| A7 | 8.6387783E−08 | 2.9150149E−07 |
| A8 | 7.6056680E−09 | −1.2134103E−08 |
| A9 | −1.1505650E−10 | 1.3521250E−09 |
| A10 | −4.6841411E−11 | 1.4021694E−10 |

TABLE 12-continued

| | | | |
|---|---|---|---|
| A11 | 2.5090626E-13 | | -1.4283715E-11 |
| A12 | 1.0814883E-13 | | -3.6594459E-13 |

| | Sn | | | |
|---|---|---|---|---|
| | 7 | 8 | 16 | 17 |
| KA | 1.0000000E+00 | 1.0000000E+00 | 1.0000000E+00 | 1.0000000E+00 |
| A4 | -1.1325298E-04 | -5.8785480E-05 | 2.0520359E-05 | 5.4596044E-05 |
| A6 | 8.1244265E-07 | 6.3708659E-07 | 1.5370532E-07 | -1.8025519E-08 |
| A8 | -8.4292067E-09 | -6.2880744E-09 | 1.2939493E-09 | 3.4813048E-09 |
| A10 | 3.0624136E-11 | 2.6947820E-11 | -4.7673350E-11 | -8.4368736E-11 |

EXAMPLE 5

Figure 14:
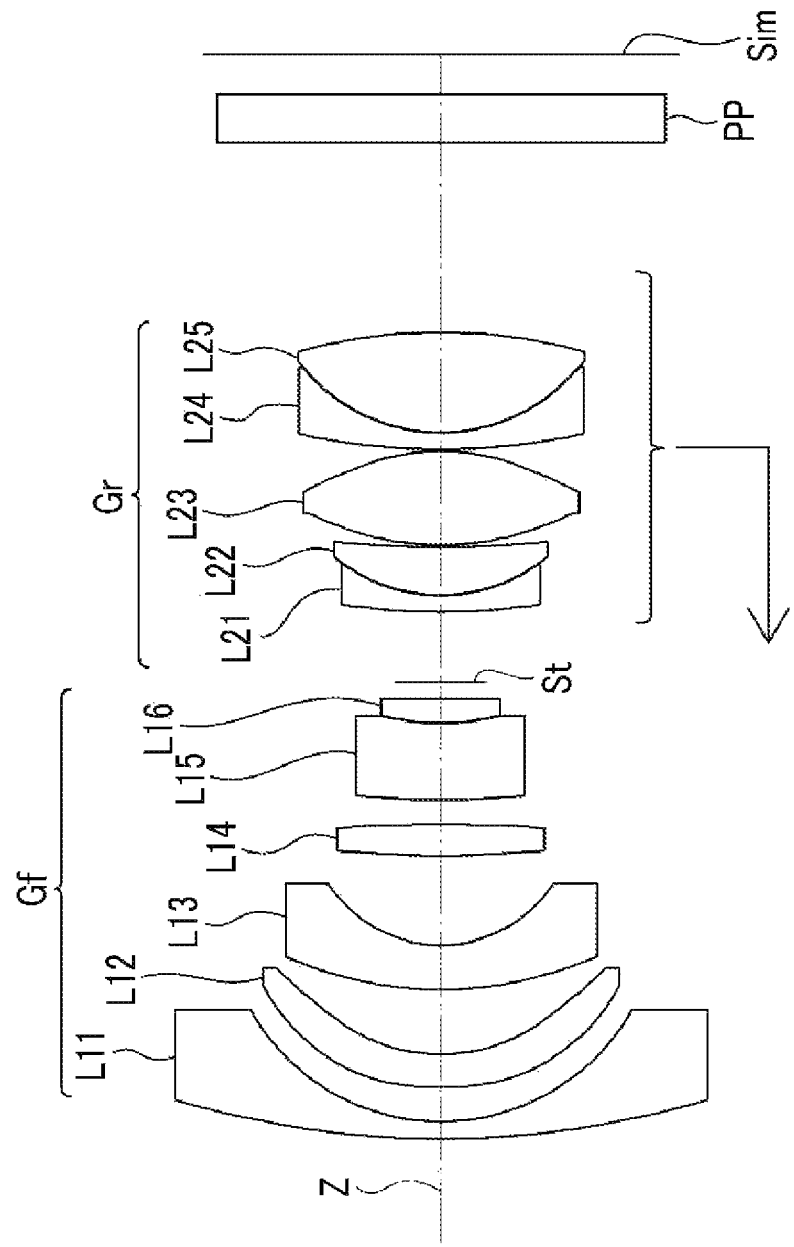
FIG. 14 is a cross-sectional view showing a configuration of an imaging lens of Example 5.

FIG. 14 is a cross-sectional view of a configuration of the imaging lens of Example 5. The imaging lens of Example 5 consists of a front group Gf, an aperture stop St, and a rear group Gr that has a positive refractive power, in order from the object side to the image side. The front group Gf consists of lenses L11 to L16, in order from the object side to the image side. The rear group Gr consists of lenses L21 to L25. During focusing from the infinite distance object to the close range object, the lenses L21 to L25 of the rear group Gr move integrally toward the object side, and the front group Gf remains stationary with respect to the image plane Sim. In addition, the term "integral movement" in the present specification means that the same amount of movement is performed in the same direction at the same time.

Figure 15:
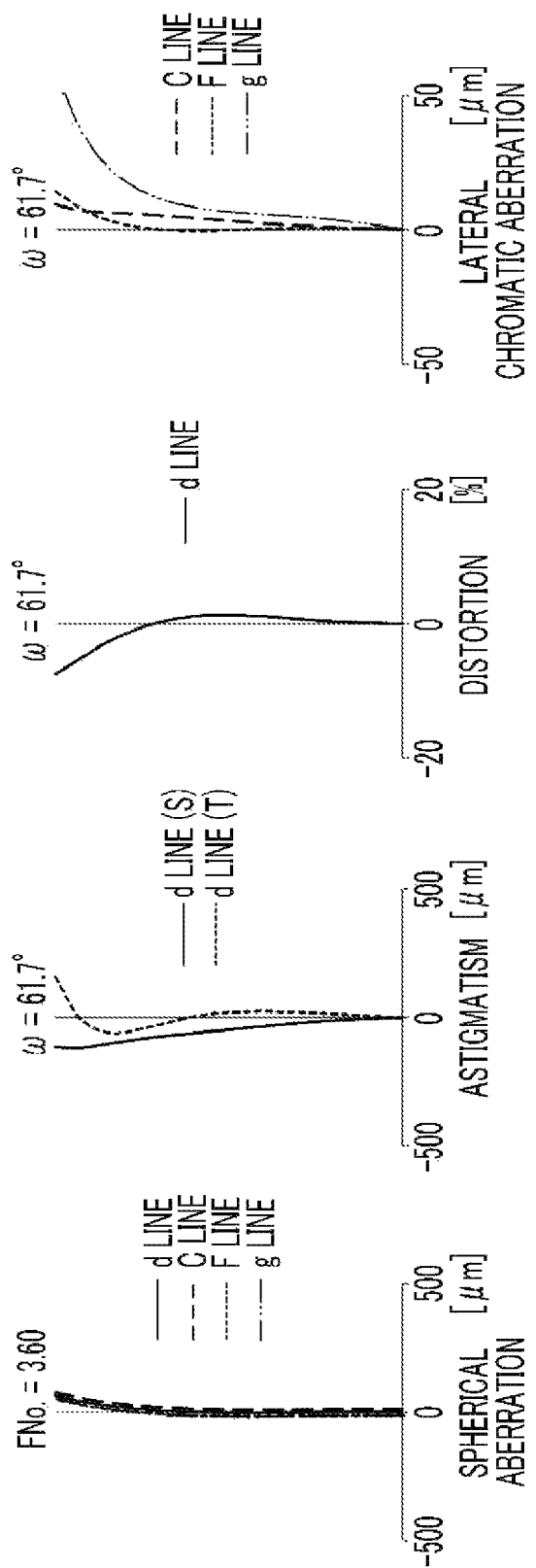
FIG. 15 is a diagram showing aberrations such as spherical aberration, astigmatism, distortion, and lateral chromatic aberration of the imaging lens of Example 5.
Figure 16:
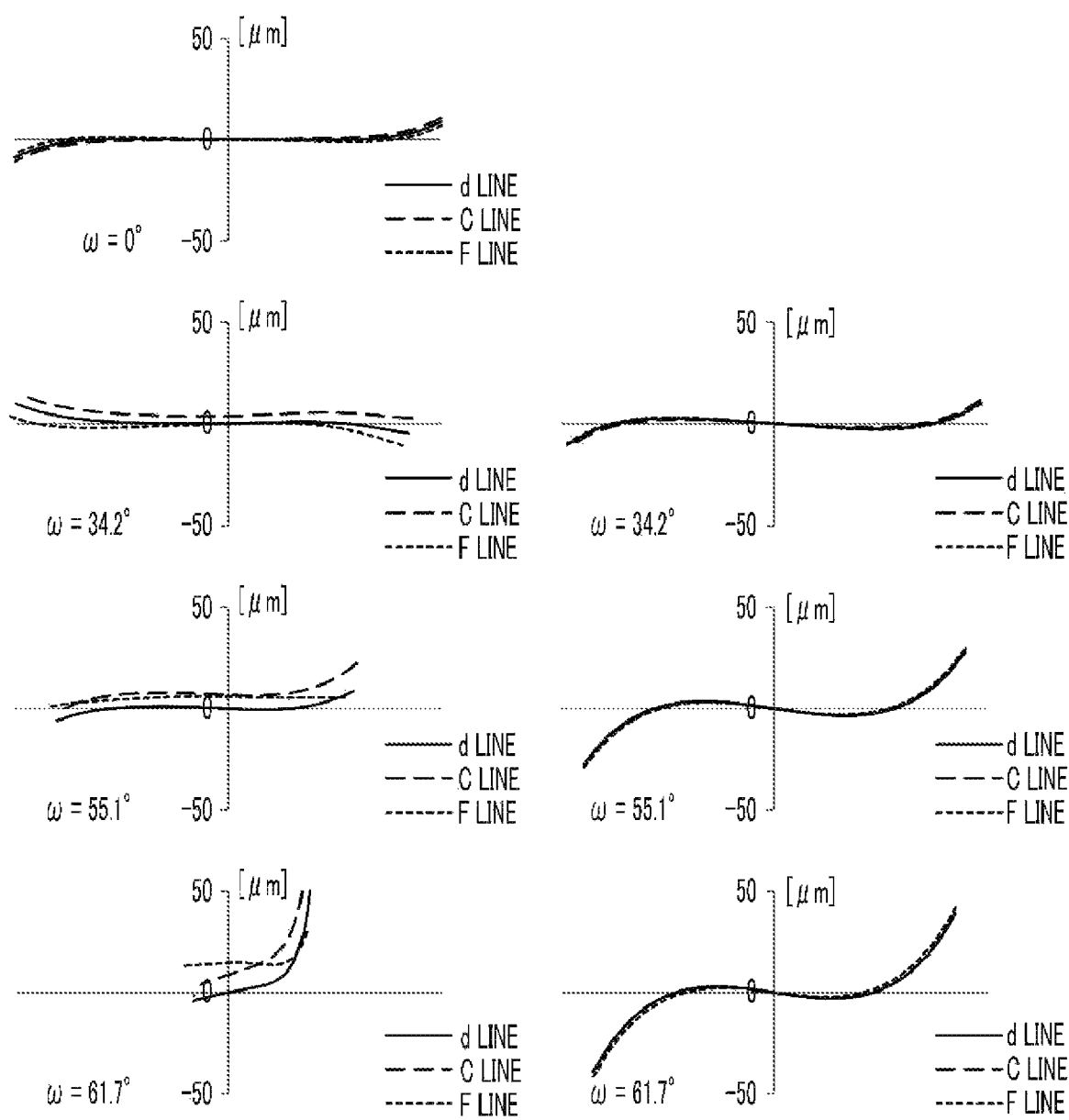
FIG. 16 is a diagram showing lateral aberrations of the imaging lens of Example 5.

Regarding the imaging lens of Example 5, Table 13 shows basic lens data, Table 14 shows specification, and Table 15 shows aspherical coefficients thereof. Further, FIGS. 15 and 16 show aberration diagrams in a state in which the infinite distance object is in focus.

TABLE 13

| Sn | R | D | Nd | vd | θgF | ΔθgF |
|---|---|---|---|---|---|---|
| 1 | 56.31916 | 1.000 | 1.64000 | 60.08 | 0.5370 | -0.00725 |
| 2 | 13.15783 | 2.052 | | | | |
| *3 | 20.75402 | 1.979 | 1.58313 | 59.38 | 0.5424 | -0.00305 |

TABLE 13-continued

| Sn | R | D | Nd | vd | θgF | ΔθgF |
|---|---|---|---|---|---|---|
| *4 | 11.80042 | 3.840 | | | | |
| 5 | 22.89017 | 2.604 | 1.51633 | 64.14 | 0.5353 | -0.00241 |
| 6 | 8.09476 | 5.290 | | | | |
| *7 | 36.50812 | 1.853 | 1.92286 | 20.88 | 0.6370 | 0.02930 |
| *8 | -694.34539 | 1.500 | | | | |
| 9 | 50.65064 | 4.565 | 1.68893 | 31.07 | 0.6004 | 0.00918 |
| 10 | 14.45227 | 1.437 | 1.72000 | 50.23 | 0.5521 | -0.00809 |
| 11 | 588.82703 | 1.000 | | | | |
| 12(St) | ∞ | 4.177 | | | | |
| 13 | 40.06327 | 1.000 | 1.91082 | 35.25 | 0.5822 | -0.00223 |
| 14 | 10.18776 | 2.870 | 1.74950 | 35.33 | 0.5819 | -0.00245 |
| 15 | 63.15611 | 0.120 | | | | |
| *16 | 16.64989 | 5.593 | 1.49710 | 81.56 | 0.5385 | 0.02894 |
| *17 | -12.00913 | 0.099 | | | | |
| 18 | 40.13080 | 1.000 | 1.91082 | 35.25 | 0.5822 | -0.00223 |
| 19 | 10.79424 | 5.970 | 1.49700 | 81.61 | 0.5389 | 0.02941 |
| 20 | -32.50688 | 11.257 | | | | |
| 21 | ∞ | 2.850 | 1.51680 | 64.20 | 0.5343 | |
| 22 | ∞ | 2.398 | | | | |

TABLE 14

| | |
|---|---|
| f | 8.258 |
| Bf | 15.534 |
| FNo. | 3.60 |
| 2 ωm(°) | 123.4 |

TABLE 15

| | Sn | |
|---|---|---|
| | 3 | 4 |
| KA | 1.0000000E+00 | 1.0000000E+00 |
| A3 | 0.0000000E+00 | 0.0000000E+00 |
| A4 | 5.1372622E-04 | 4.3307992E-04 |
| A5 | -2.1987709E-05 | -2.6140620E-05 |
| A6 | -3.5149683E-06 | -2.5707968E-06 |
| A7 | 3.2842222E-07 | -5.9874839E-08 |
| A8 | 1.9804370E-09 | -9.4112008E-09 |
| A9 | -4.2130030E-10 | 1.4146572E-09 |
| A10 | -5.6821937E-11 | 2.5165761E-10 |
| A11 | 1.2523848E-12 | -5.8060325E-12 |
| A12 | 3.1670693E-13 | -1.2104376E-12 |

| | Sn | | | |
|---|---|---|---|---|
| | 7 | 8 | 16 | 17 |
| KA | 1.0000000E+00 | 1.0000000E+00 | 1.0000000E+00 | 1.0000000E+00 |
| A4 | -2.3570092E-04 | -2.2337396E-04 | -4.0234476E-05 | 1.7409058E-04 |
| A6 | 2.2029764E-06 | 3.7905745E-06 | 4.4576840E-07 | -1.0539836E-08 |
| A8 | 2.7373538E-08 | -2.8561801E-08 | -4.0795207E-09 | 7.0017939E-09 |
| A10 | -7.1060563E-10 | -3.1083669E-10 | -1.6755060E-11 | -9.2826642E-11 |

EXAMPLE 6

Figure 17:
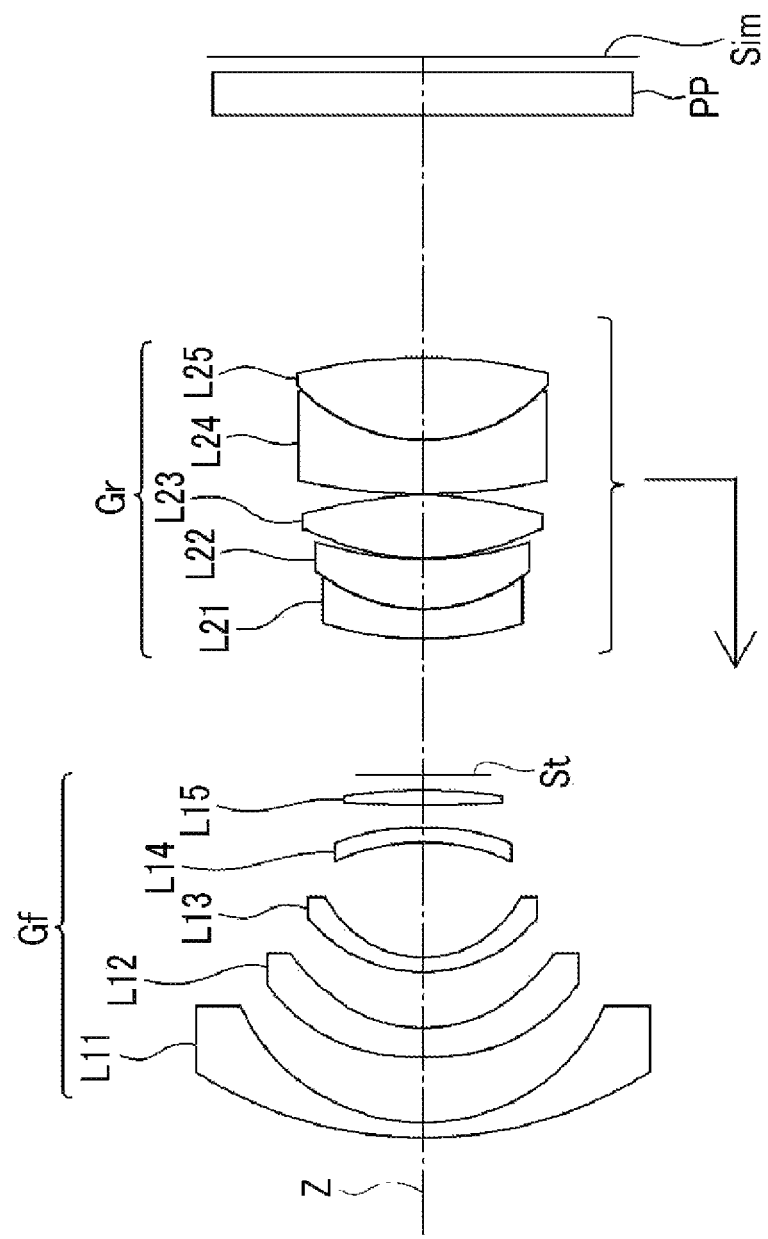
FIG. 17 is a cross-sectional view showing a configuration of an imaging lens of Example 6.

FIG. 17 is a cross-sectional view of a configuration of the imaging lens of Example 6. The imaging lens of Example 6 consists of a front group Gf, an aperture stop St, and a rear group Gr that has a positive refractive power, in order from the object side to the image side. The front group Gf consists of lenses L11 to L15, in order from the object side to the image side. The rear group Gr consists of lenses L21 to L25.

During focusing from the infinite distance object to the close range object, the lenses L21 to L25 of the rear group Gr move integrally toward the object side, and the front group Gf remains stationary with respect to the image plane Sim.

Figure 18:
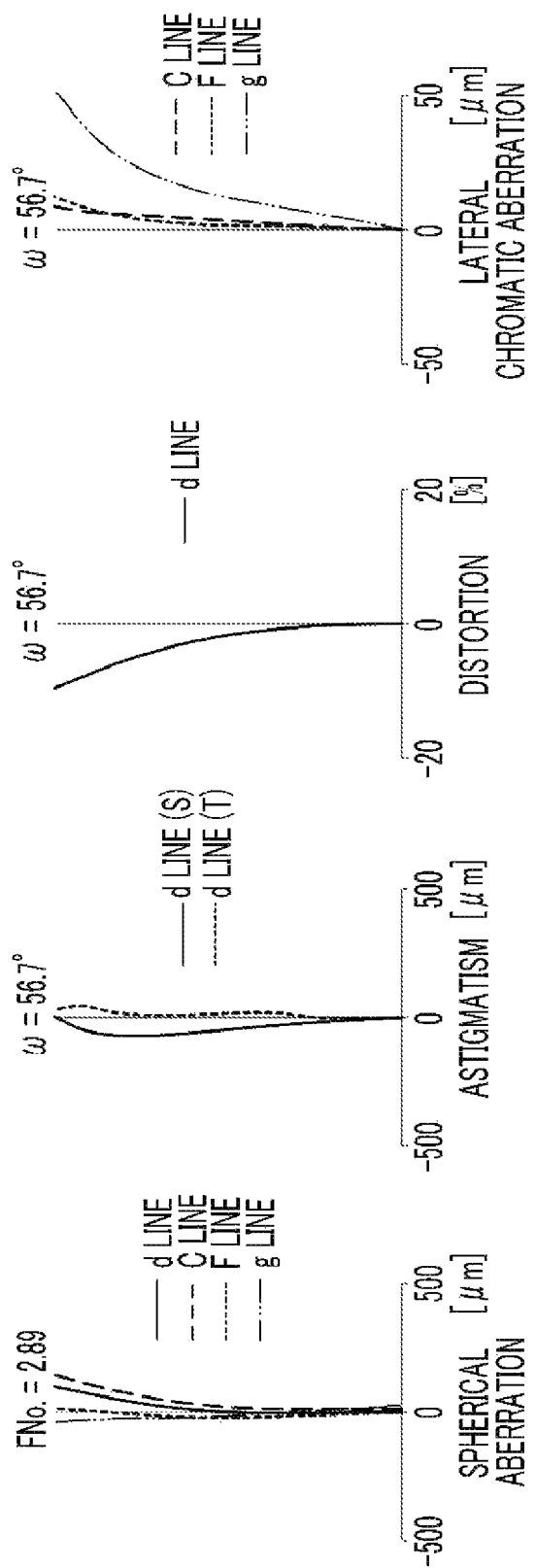
FIG. 18 is a diagram showing aberrations such as spherical aberration, astigmatism, distortion, and lateral chromatic aberration of the imaging lens of Example 6.
Figure 19:
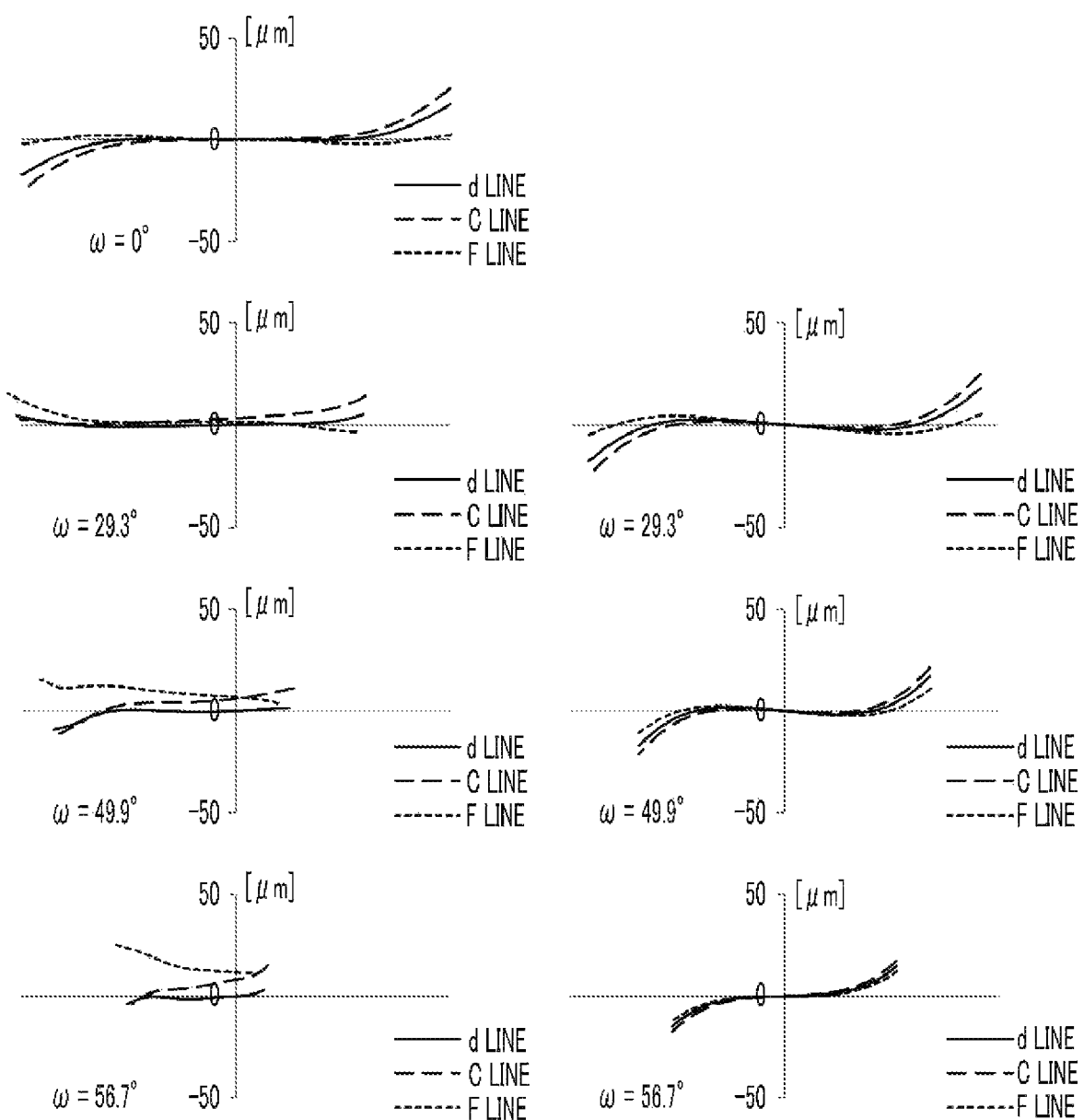
FIG. 19 is a diagram showing lateral aberrations of the imaging lens of Example 6.

Regarding the imaging lens of Example 6, Table 16 shows basic lens data, Table 17 shows specification, and Table 18 shows aspherical coefficients thereof. Further, FIGS. 18 and 19 show aberration diagrams in a state in which the infinite distance object is in focus.

TABLE 16

| Sn | R | D | Nd | vd | θgF | ΔθgF |
|---|---|---|---|---|---|---|
| 1 | 27.72601 | 1.000 | 1.88300 | 39.22 | 0.5729 | −0.00516 |
| 2 | 13.15784 | 4.358 | | | | |
| *3 | 20.75317 | 2.000 | 1.56420 | 60.41 | 0.5385 | −0.00525 |
| *4 | 10.83497 | 3.712 | | | | |
| 5 | 9.79550 | 1.000 | 1.58400 | 56.85 | 0.5473 | −0.00227 |
| 6 | 7.25403 | 7.627 | | | | |
| *7 | −14.35400 | 1.000 | 1.68910 | 31.17 | 0.5986 | 0.00753 |
| *8 | −18.46865 | 1.500 | | | | |
| 9 | 94.34955 | 1.000 | 1.85070 | 26.91 | 0.6131 | 0.01514 |
| 10 | −33.62005 | 0.977 | | | | |
| 11(St) | ∞ | 9.140 | | | | |
| 12 | 21.80773 | 2.000 | 1.83490 | 42.69 | 0.5635 | −0.00895 |
| 13 | 10.92491 | 3.324 | 1.68376 | 37.64 | 0.5782 | −0.00237 |
| 14 | 21.79785 | 0.100 | | | | |
| *15 | 16.06490 | 4.178 | 1.48563 | 85.19 | 0.5386 | 0.03492 |
| *16 | −21.18043 | 0.100 | | | | |
| 17 | 38.47294 | 3.604 | 1.96300 | 24.11 | 0.6213 | 0.01877 |
| 18 | 11.07592 | 5.521 | 1.52841 | 76.45 | 0.5395 | 0.02174 |
| 19 | −33.21732 | 16.148 | | | | |
| 20 | ∞ | 2.850 | 1.51680 | 64.20 | 0.5343 | |
| 21 | ∞ | 1.105 | | | | |

TABLE 17

| f | 10.304 |
|---|---|
| Bf | 19.132 |
| FNo. | 2.89 |
| 2 ωm(°) | 113.4 |

TABLE 18

| | Sn | |
|---|---|---|
| | 3 | 4 |
| KA | 1.0000000E+00 | 1.0000000E+00 |
| A3 | 0.0000000E+00 | 0.0000000E+00 |
| A4 | 4.0008505E−04 | 3.7846833E−04 |
| A5 | −1.9291343E−05 | −6.1403270E−06 |
| A6 | −1.3418718E−06 | −4.1612768E−06 |
| A7 | 8.1295202E−08 | 2.3115545E−07 |
| A8 | 7.9751103E−09 | −1.6254452E−08 |
| A9 | −5.2044019E−11 | 1.0451228E−09 |
| A10 | −4.2237172E−11 | 1.1802960E−10 |
| A11 | 3.1138299E−13 | −1.5826384E−11 |
| A12 | 7.1974291E−14 | −5.5780145E−13 |

| | Sn | | | |
|---|---|---|---|---|
| | 7 | 8 | 15 | 16 |
| KA | 1.0000000E+00 | 1.0000000E+00 | 1.0000000E+00 | 1.0000000E+00 |
| A4 | −1.5588516E−05 | −5.5755903E−05 | −5.7918958E−06 | 8.1280485E−05 |
| A6 | −4.4303415E−07 | −2.0708562E−07 | −3.2772965E−09 | −6.4729384E−08 |
| A8 | −1.4509873E−08 | −4.1970916E−08 | 8.2732195E−11 | 1.5206699E−09 |
| A10 | −9.3879825E−10 | −2.5018576E−10 | −2.1084905E−11 | −4.6742172E−11 |

EXAMPLE 7

Figure 20:
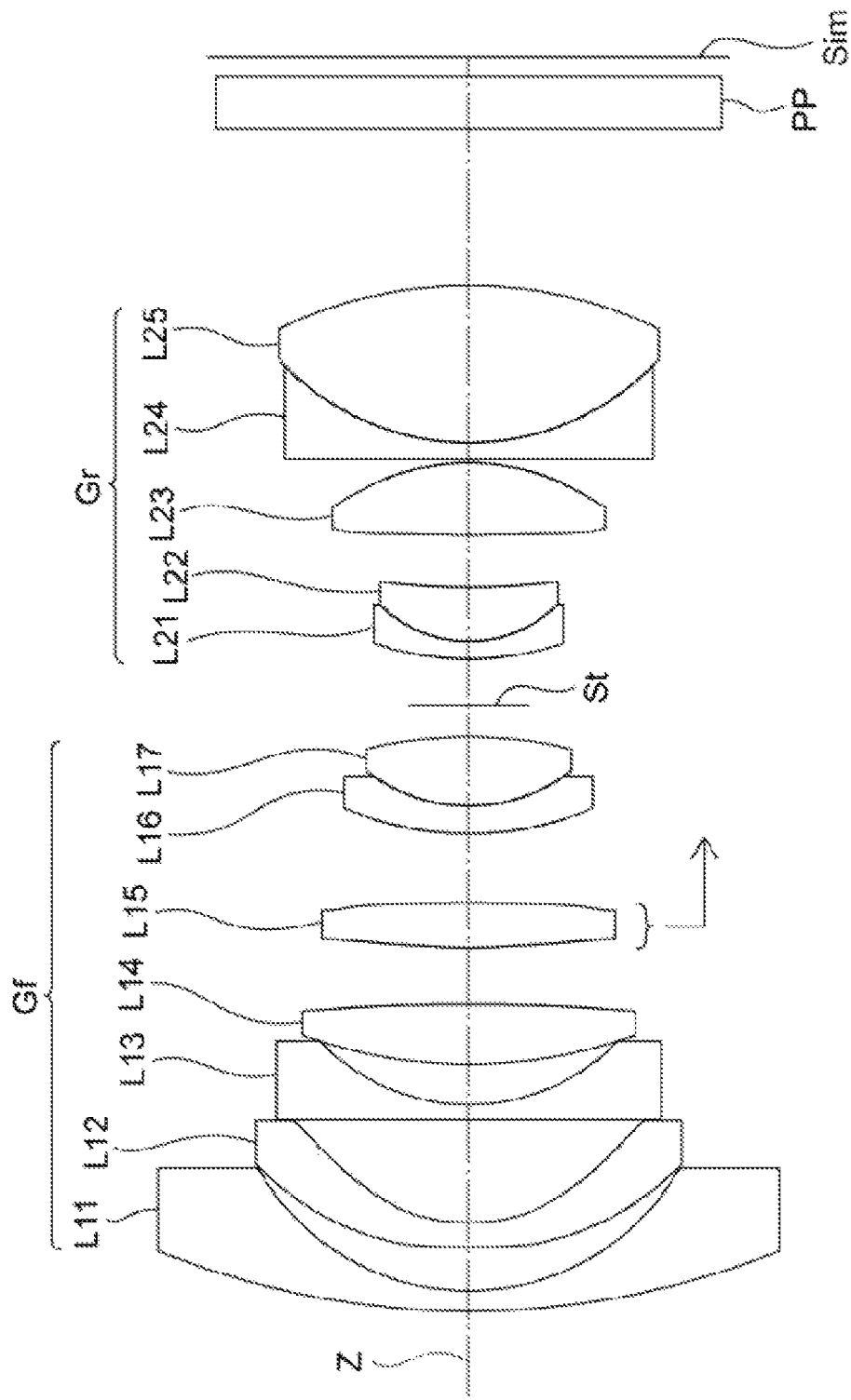
FIG. 20 is a cross-sectional view showing a configuration of an imaging lens of Example 7.

FIG. 20 is a cross-sectional view of a configuration of the imaging lens of Example 7. The imaging lens of Example 7 consists of a front group Gf, an aperture stop St, and a rear group Gr that has a positive refractive power, in order from the object side to the image side. The front group Gf consists of lenses L11 to L17, in order from the object side to the image side. The rear group Gr consists of lenses L21 to L25. During focusing from the infinite distance object to the close range object, the lens L15 moves toward the image side, and the other lenses remain stationary with respect to the image plane Sim.

Figure 21:
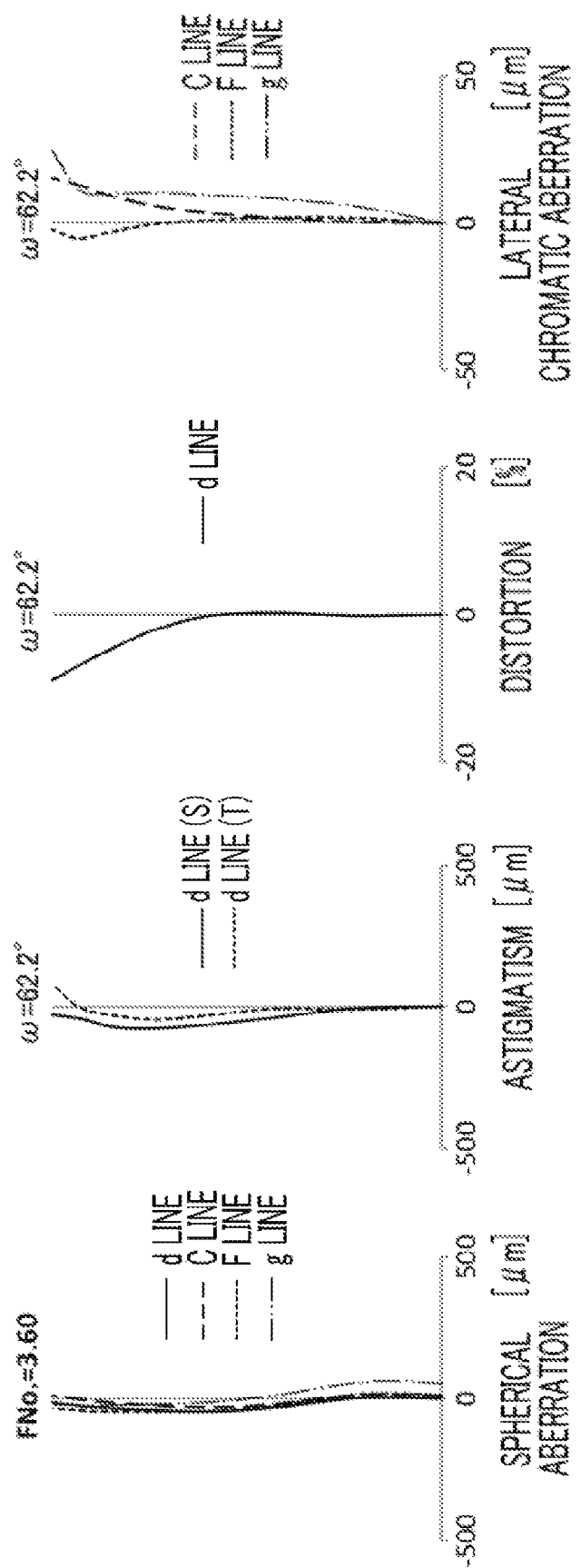
FIG. 21 is a diagram showing aberrations such as spherical aberration, astigmatism, distortion, and lateral chromatic aberration of the imaging lens of Example 7.
Figure 22:
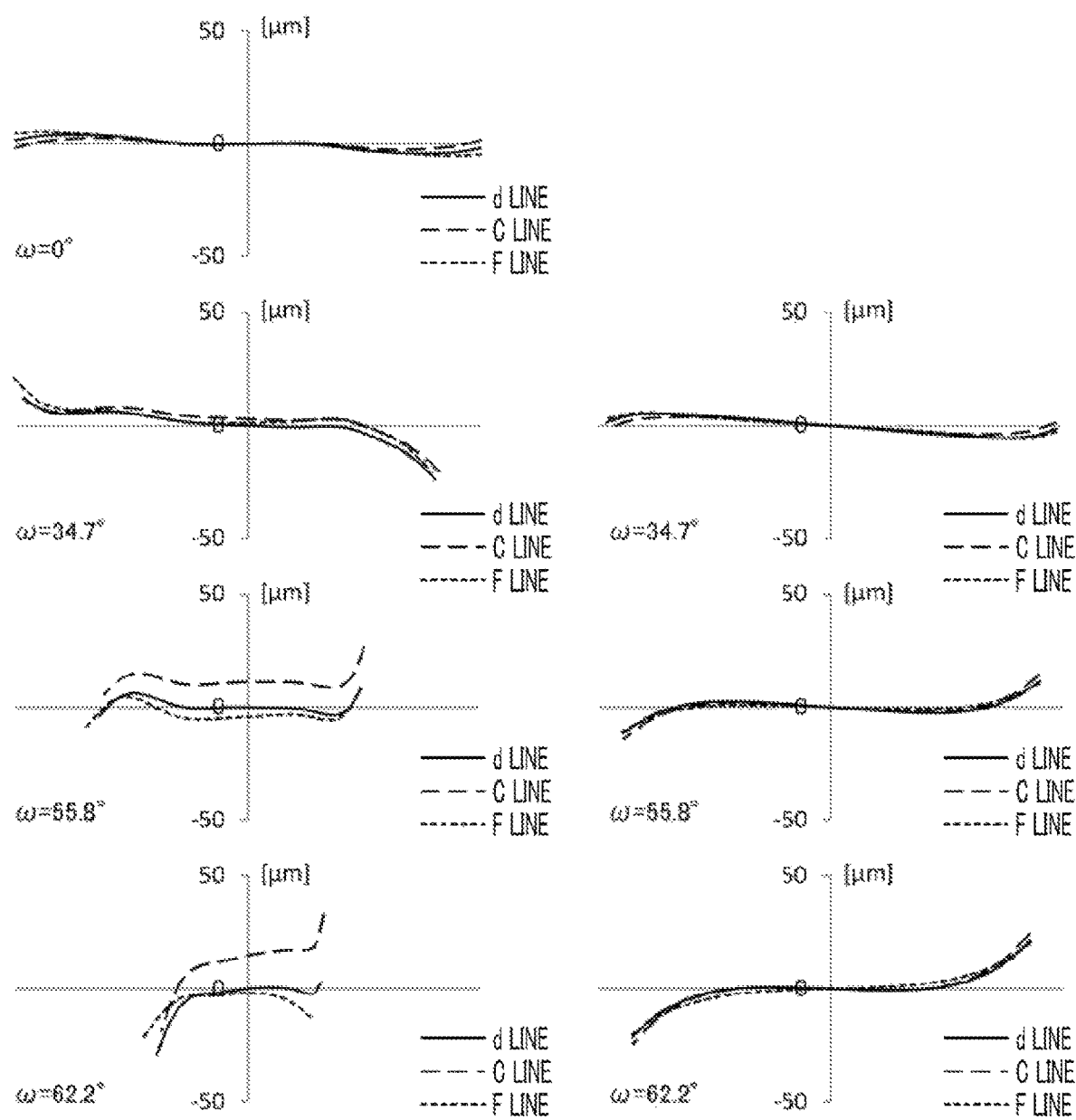
FIG. 22 is a diagram showing lateral aberrations of the imaging lens of Example 7.

Regarding the imaging lens of Example 7, Table 19 shows basic lens data, Table 20 shows specification, and Table 21 shows aspherical coefficients thereof. Further, FIGS. 21 and 22 show aberration diagrams in a state in which the infinite distance object is in focus.

TABLE 19

| Sn | R | D | Nd | vd | θgF | ΔθgF |
|---|---|---|---|---|---|---|
| 1 | 45.15513 | 1.000 | 1.72916 | 54.68 | 0.5448 | −0.00819 |
| 2 | 13.20789 | 2.400 | | | | |
| *3 | 174.41661 | 1.350 | 1.58313 | 59.46 | 0.5406 | −0.00473 |
| *4 | 12.08620 | 5.680 | | | | |
| 5 | ∞ | 0.800 | 1.60300 | 65.44 | 0.5402 | 0.00460 |
| 6 | 11.21958 | 2.220 | | | | |
| 7 | 26.59657 | 3.290 | 1.61266 | 44.46 | 0.5640 | −0.00553 |
| 8 | −108.86637 | 3.128 | | | | |
| *9 | 36.76899 | 2.450 | 1.58313 | 59.46 | 0.5406 | −0.00473 |
| *10 | −188.30998 | 3.801 | | | | |
| 11 | 17.18628 | 1.520 | 1.91082 | 35.25 | 0.5822 | −0.00223 |
| 12 | 9.08370 | 3.800 | 1.65410 | 39.54 | 0.5725 | −0.00501 |

TABLE 19-continued

| Sn | R | D | Nd | νd | θgF | ΔθgF |
|---|---|---|---|---|---|---|
| 13 | −23.29081 | 1.700 | | | | |
| 14(St) | ∞ | 2.580 | | | | |
| 15 | 16.09332 | 0.960 | 1.95375 | 32.33 | 0.5906 | 0.00136 |
| 16 | 6.78270 | 2.980 | 1.45650 | 90.27 | 0.5350 | 0.03957 |
| 17 | 38.40003 | 2.870 | | | | |
| *18 | 137.05760 | 3.970 | 1.58313 | 59.46 | 0.5406 | −0.00473 |
| *19 | −11.91332 | 0.200 | | | | |
| 20 | ∞ | 0.900 | 1.91082 | 35.25 | 0.5822 | −0.00223 |
| 21 | 14.04360 | 8.630 | 1.49700 | 81.54 | 0.5375 | 0.02791 |
| 22 | −23.92085 | 8.622 | | | | |
| 23 | ∞ | 2.850 | 1.51680 | 64.20 | 0.5343 | −0.00332 |
| 24 | ∞ | 1.104 | | | | |

TABLE 20

| | |
|---|---|
| f | 8.211 |
| Bf | 11.604 |
| FNo. | 3.60 |
| 2ωm(°) | 124.4 |

TABLE 21

| | Sn | | |
|---|---|---|---|
| | 3 | 4 | 9 |
| KA | −3.0000004E+00 | 1.3330054E+00 | −8.7313612E−01 |
| A3 | 0.0000000E+00 | 0.0000000E+00 | 0.0000000E+00 |
| A4 | 4.9487091E−04 | 1.1246059E−03 | −1.0196629E−06 |
| A5 | 4.9741863E−04 | −4.6910840E−04 | −9.3998369E−05 |
| A6 | −1.6540810E−04 | 3.9012925E−04 | 2.9084823E−05 |
| A7 | 1.7519830E−05 | −1.4261742E−04 | −1.5051023E−06 |
| A8 | −4.0747508E−07 | 2.3303155E−05 | −7.6112222E−07 |

TABLE 21-continued

| | | | |
|---|---|---|---|
| A9 | −1.4731992E−08 | −1.5623393E−06 | 2.9450842E−08 |
| A10 | −4.4813603E−09 | −2.5013434E−08 | 2.3172404E−08 |
| A12 | −2.4901866E−11 | −2.3194237E−09 | 2.3383099E−09 |
| A13 | 9.5563701E−12 | 3.4506102E−10 | −8.5382189E−10 |
| A14 | −1.3239953E−12 | −3.0305885E−11 | 1.3237416E−10 |
| A15 | 7.2564061E−14 | 1.2811186E−12 | −9.4528830E−12 |
| A16 | −1.4450456E−15 | −1.9371825E−14 | 2.6075998E−13 |

| | Sn | | |
|---|---|---|---|
| | 10 | 18 | 19 |
| KA | −3.0000000E+00 | 4.9989554E+00 | 1.1376218E+00 |
| A3 | 0.0000000E+00 | 0.0000000E+00 | 0.0000000E+00 |
| A4 | 2.2546535E−04 | 2.6245673E−04 | 4.6484978E−05 |
| A5 | −3.6192300E−04 | −2.7458410E−04 | 1.4308724E−04 |
| A6 | 1.6675347E−04 | 1.0938223E−04 | −1.1163781E−04 |
| A7 | −2.7532931E−05 | −1.8437536E−05 | 3.8111592E−05 |
| A8 | −3.2221691E−06 | −1.0204552E−06 | −5.8248842E−06 |
| A9 | 1.5778332E−06 | 6.2231054E−07 | −1.8944463E−08 |
| A10 | −5.6592891E−08 | 1.1160608E−08 | 9.8547972E−08 |
| A11 | −3.7290165E−08 | −6.7426950E−09 | −8.8876089E−10 |
| A12 | 4.8360862E−09 | −5.3228796E−09 | −1.2437786E−09 |
| A13 | −4.6760331E−11 | 1.5553671E−09 | −2.3619694E−10 |
| A14 | −1.0578917E−11 | −1.6347919E−10 | 8.3049095E−11 |
| A15 | −1.3117822E−12 | 7.2844763E−12 | −7.8530735E−12 |
| A16 | 1.2124261E−13 | −1.0256516E−13 | 2.6121335E−13 |

Table 22 shows corresponding values of Conditional Expressions (1) to (16) of the imaging lenses of Examples 1 to 7.

TABLE 22

| Expression Number | Conditional Expression | Example 1 | Example 2 | Example 3 | Example 4 |
|---|---|---|---|---|---|
| (1) | H/(f × tanωm) | 1.262 | 1.589 | 1.300 | 1.109 |
| (2) | TL/(f × tanωm) | 4.593 | 4.354 | 4.582 | 4.582 |
| (3) | ωm | 61.8 | 65.3 | 59.4 | 56.7 |
| (4) | ff/fr | 1.704 | 1.335 | 1.012 | 0.762 |
| (5) | (R1f + R1r)/(R1f − R1r) | 1.77041 | 3.24786 | 3.66120 | 3.36530 |
| (6) | (R2r − R3f)/(R2r + R3f) | −0.49583 | −0.75046 | −0.52215 | −0.40182 |
| (7) | f/fr | 3.002 | 3.315 | 3.423 | 3.668 |
| (8) | νfp | 31.02 | 31.02 | 31.02 | 31.02 |
| (9) | θgFrp1 +0.001618 × νrp1 − 0.6415 | 0.02174 | 0.03470 | 0.03470 | 0.02894 |
| (10) | θgFrp2 +0.001618 × νrp2 − 0.6415 | 0.02894 | 0.02894 | 0.02894 | 0.02174 |
| (11) | Nrn1 | 1.91082 | 1.88300 | 1.88300 | 1.88300 |
| (12) | Nrn2 | 1.91082 | 1.92119 | 1.92119 | 1.96300 |
| (13) | Ds/(f × tanωm) | 2.033 | 2.038 | 2.019 | 2.005 |
| (14) | f/|fal| | 4.038 | 5.970 | 11.339 | 14.572 |
| (15) | Ds/TL | 0.443 | 0.468 | 0.441 | 0.438 |
| (16) | Bf/(f × tanωm) | 0.897 | 0.856 | 1.030 | 1.076 |

| Expression Number | Conditional Expression | Examples | Example 6 | Example 7 |
|---|---|---|---|---|
| (1) | H/(f × tanωm) | 1.095 | 1.141 | 1.145 |
| (2) | TL/(f × tanωm) | 3.630 | 4.544 | 4.363 |
| (3) | ωm | 64.7 | 56.7 | 62.2 |
| (4) | ff/fr | −1.765 | −2.893 | 0.268 |
| (5) | (R1f + R1r)/(R1f − R1r) | 1.60970 | 2.80638 | 1.82686 |

TABLE 22-continued

| | | | | |
|---|---|---|---|---|
| (6) | (R2r − R3f)/(R2r + R3f) | −0.31968 | 0.05039 | −1.00000 |
| (7) | f/fr | 2.054 | 1.236 | 4.802 |
| (8) | vfp | 20.88 | 31.17 | 39.54 |
| (9) | θgFrp1 +0.001618 × vrp1 − 0.6415 | 0.02894 | 0.03492 | 0.03957 |
| (10) | θgFrp2 +0.001618 × vrp2 − 0.6415 | 0.02941 | 0.02174 | 0.02791 |
| (11) | Nrn1 | 1.91082 | 1.83490 | 1.95375 |
| (12) | Nrn2 | 1.91082 | 1.96300 | 1.91082 |
| (13) | Ds/(f × tanωm) | 1.551 | 1.541 | 2.135 |
| (14) | f/|fa| | 2.054 | 1.236 | 6.450 |
| (15) | Ds/TL | 0.427 | 0.339 | 0.489 |
| (16) | Bf/(f × tanωm) | 0.888 | 1.220 | 0.745 |

From the above-mentioned data, it can be seen that the imaging lenses of Examples 1 to 7 have small size and favorable optical performance while being configured to have a wide angle with a maximum half angle of view greater than 50 degrees.

Figure 23:
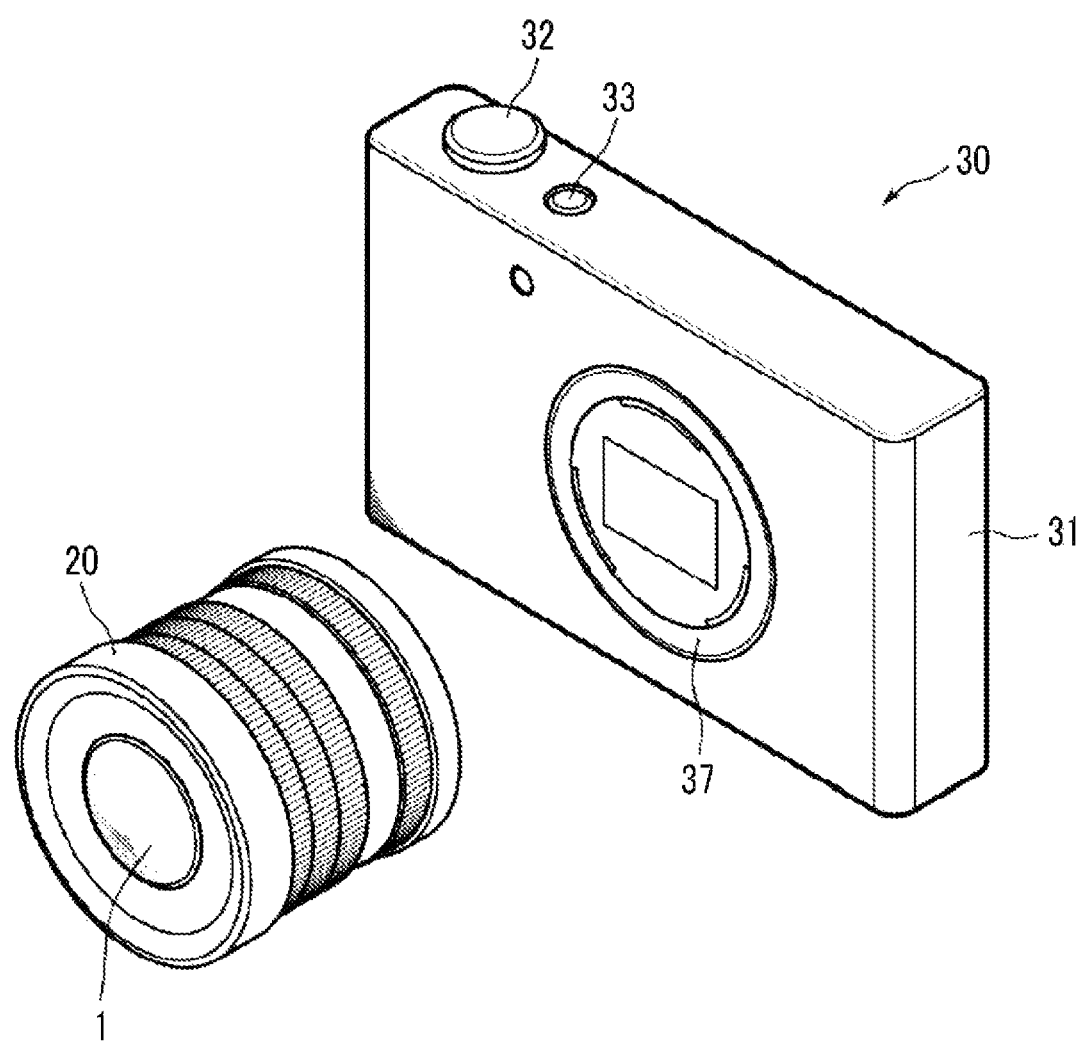
FIG. 23 is a perspective view of the front side of the imaging apparatus according to an embodiment.
Figure 24:
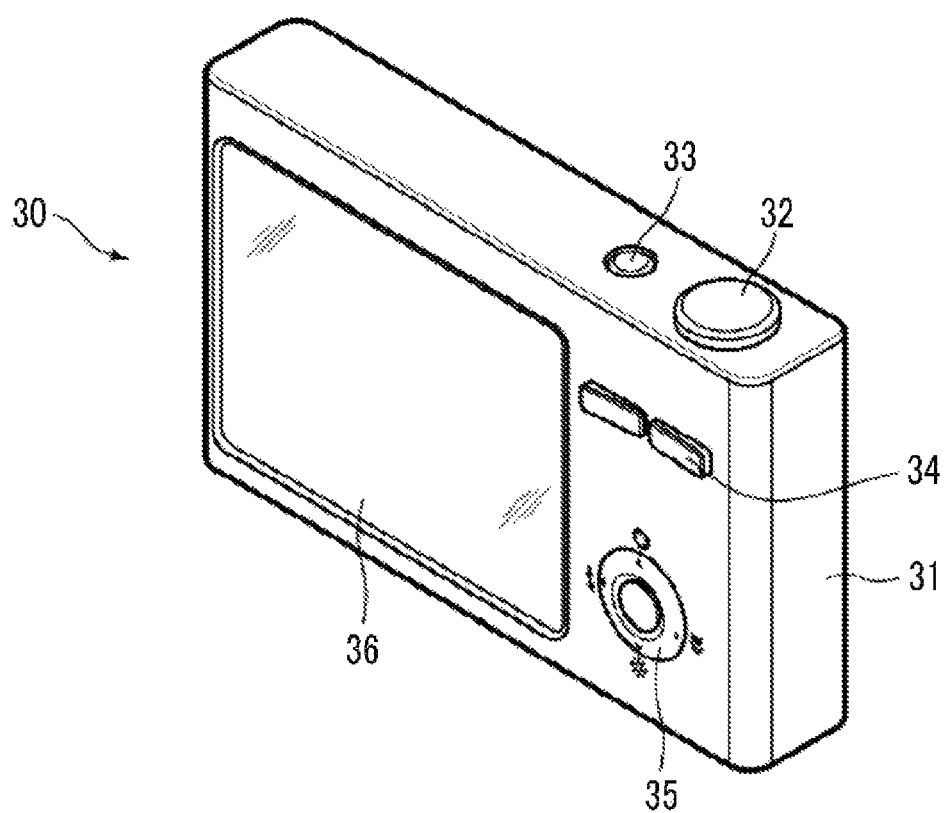
FIG. 24 is a perspective view of the rear side of the imaging apparatus according to the embodiment.

Next, an imaging apparatus according to an embodiment of the present disclosure will be described. FIGS. 23 and 24 are external views of a camera 30 which is the imaging apparatus according to the embodiment of the present disclosure. FIG. 23 is a perspective view of the camera 30 viewed from a front side, and FIG. 24 is a perspective view of the camera 30 viewed from a rear side. The camera 30 is a so-called mirrorless type digital camera, and the interchangeable lens 20 can be removably attached thereto. The interchangeable lens 20 is configured to include the imaging lens 1, which is housed in a lens barrel, according to an embodiment of the present disclosure.

The camera 30 comprises a camera body 31, and a shutter button 32 and a power button 33 are provided on an upper surface of the camera body 31. Further, an operating part 34, an operating part 35, and a display unit 36 are provided on a rear surface of the camera body 31. The display unit 36 is able to display a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video in a case where the shutter button 32 is pressed, and is able to store image data, which is obtained through imaging, in the storage medium.

Further, the camera 30 may have a so-called autofocus function. Specifically, even in a case where the camera body 31 may be provided with a processor (for example, a central processing unit (CPU) or the like), and a lens shift mechanism for driving a memory and a focus unit (for example, an actuator such as a solenoid and a motor). The processor executes a control program in cooperation with the memory to determine an appropriate focusing position and control the lens shift mechanism such that the focus unit moves to the focusing position. That is, in the camera 30 according to the present embodiment, the position of the focus group may be electrically controlled by the processor in the camera body 31 during focusing. With such a configuration, it is easy for the subject to be in focus, and convenience is improved.

The technique of the present disclosure has been hitherto described through embodiments and examples, but the technique of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the examples, and different values may be used therefor.

Further, the imaging apparatus according to the embodiment of the present disclosure is not limited to the above-mentioned example, and may be modified into various forms such as a camera other than the mirrorless type, a film camera, and a video camera.

What is claimed is:

1. An imaging lens consisting of, in order from an object side to an image side: a front group; a stop; and a rear group that has a positive refractive power,
    wherein assuming that
        a height of a principal ray with a maximum image height from an optical axis in a plane which is perpendicular to the optical axis and which passes through an intersection between the optical axis and a lens surface closest to the object side in a state in which an infinite distance object is in focus is H,
        a focal length of the imaging lens in a state in which the infinite distance object is in focus is f,
        a sum of a back focal length in terms of air conversion distance and a distance on the optical axis from the lens surface closest to the object side to a lens surface closest to the image side in a state in which the infinite distance object is in focus is TL,
        a maximum half angle of view of the imaging lens is ωm, and
        a unit of ωm is degree,
    Conditional Expressions (1), (2), and (3) are satisfied, which are represented by $$1 < H/(f \times \tan \omega m) < 1.8 \tag{1},$$

$$3.1 < TL/(f \times \tan \omega m) < 5.2 \tag{2, and}$$

$$52 < \omega m < 74 \tag{3}.$$

2. The imaging lens according to claim 1, wherein during focusing,
  at least a part of the front group moves, and
  the rear group remains stationary with respect to an image plane.

3. The imaging lens according to claim 2, wherein assuming that
  a focal length of the front group in a state in which the infinite distance object is in focus is ff, and
  a focal length of the rear group is fr,
  Conditional Expression (4) is satisfied, which is represented by $$0.2 < ff/fr < 2 \qquad (4).$$

4. The imaging lens according to claim 1, wherein during focusing,
  at least a part of the rear group moves, and
  the front group remains stationary with respect to an image plane.

5. The imaging lens according to claim 1, wherein there are provided
  a first lens that is a negative meniscus lens which is disposed closest to the object side and has a convex surface facing toward the object side, and
  a second lens that is a negative meniscus lens which is disposed adjacent to the image side of the first lens and has a convex surface facing toward the object side.

6. The imaging lens according to claim 5, wherein assuming that
  a curvature radius of an object side surface of the first lens is R1f, and
  a curvature radius of an image side surface of the first lens is R1r,
  Conditional Expression (5) is satisfied, which is represented by $$1.3 < (R1f + R1r)/(R1f - R1r) < 4.2 \qquad (5).$$

7. The imaging lens according to claim 5, further comprising a third lens which is disposed adjacent to the image side of the second lens,
  wherein the third lens is a negative meniscus lens having a convex surface facing toward the object side, or a plano-concave lens of which a surface on the object side is flat.

8. The imaging lens according to claim 7, wherein assuming that
  a curvature radius of an image side surface of the second lens is R2r, and
  a curvature radius of an object side surface of the third lens is R3f,
  Conditional Expression (6) is satisfied, which is represented by $$-1 < (R2r - R3f)/(R2r + R3f) < 0.3 \qquad (6).$$

9. The imaging lens according to claim 1, wherein the front group consists of 5 or more and 7 or fewer lenses.

10. The imaging lens according to claim 1, wherein the rear group consists of 5 or more and 7 or fewer lenses.

11. The imaging lens according to claim 1, wherein assuming that a focal length of the rear group in a state in which the infinite distance object is in focus is fr,
  Conditional Expression (7) is satisfied, which is represented by $$1 < f/fr < 7 \qquad (7).$$

12. The imaging lens according to claim 1, wherein
  the front group includes an Lfp lens that has a positive refractive power, and
  assuming that an Abbe number of the Lfp lens based on a d line is vfp,
  Conditional Expression (8) is satisfied, which is represented by $$16 < vfp < 42 \qquad (8).$$

13. The imaging lens according to claim 1, wherein
  the rear group includes an Lrp1 lens that has a positive refractive power, and
  assuming that
  a partial dispersion ratio of the Lrp1 lens between a g line and an F line is θgFrp1, and
  an Abbe number of the Lrp1 lens based on a d line is vrp1,
  Conditional Expression (9) is satisfied, which is represented by $$0.01 < \theta gFrp1 + 0.001618 \times vrp1 - 0.6415 < 0.1 \qquad (9).$$

14. The imaging lens according to claim 13, wherein
  the rear group includes an Lrp2 lens that has a positive refractive power and is disposed closer to the image side than the Lrp1 lens, and
  assuming that
  a partial dispersion ratio of the Lrp2 lens between the g line and the F line is θgFrp2, and
  an Abbe number of the Lrp2 lens based on the d line is vrp2,
  Conditional Expression (10) is satisfied, which is represented by $$0.01 < \theta gFrp2 + 0.001618 \times vrp2 - 0.6415 < 0.1 \qquad (10).$$

15. The imaging lens according to claim 1, wherein
  the rear group includes an Lrn1 lens that has a negative refractive power, and
  assuming that a refractive index of the Lrn1 lens on a d line is Nrn1,
  Conditional Expression (11) is satisfied, which is represented by $$1.75 < Nrn1 < 2.2 \qquad (11).$$

16. The imaging lens according to claim 15, wherein
  the rear group includes an Lrn2 lens that has a negative refractive power and is disposed closer to the image side than the Lrn1 lens, and
  assuming that a refractive index of the Lrn2 lens on the d line is Nrn2,
  Conditional Expression (12) is satisfied, which is represented by $$1.8 < Nrn2 < 2.2 \qquad (12).$$

17. The imaging lens according to claim 1, wherein
  assuming that a distance on the optical axis from the lens surface closest to the object side to the stop is Ds,
  Conditional Expression (13) is satisfied, which is represented by $$1.2 < Ds/(f \times \tan \omega m) < 2.8 \qquad (13).$$

18. The imaging lens according to claim 2, wherein
  assuming that a focal length of a lens group that moves during focusing is fa,
  Conditional Expression (14) is satisfied, which is represented by $$1 < f/|fa| < 20 \qquad (14).$$

19. The imaging lens according to claim 1, wherein assuming that a distance on the optical axis from the lens surface closest to the object side to the stop in a state in which the infinite distance object is in focus is Ds, Conditional Expression (15) is satisfied, which is represented by $$0.3 < Ds/TL < 0.6 \tag{15}$$

20. An imaging apparatus comprising the imaging lens according to claim 1.

* * * * *